United States Patent
Gopalakrishnan et al.

(10) Patent No.: US 12,079,552 B2
(45) Date of Patent: *Sep. 3, 2024

(54) LATTICE BOLTZMANN SOLVER ENFORCING TOTAL ENERGY CONSERVATION

(71) Applicant: Dassault Systemes Americas Corp., Waltham, MA (US)

(72) Inventors: Pradeep Gopalakrishnan, Woburn, MA (US); Hudong Chen, Newton, MA (US); Raoyang Zhang, Burlington, MA (US); Avinash Jammalamadaka, Burlington, MA (US); Yanbing Li, Westford, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/689,131

(22) Filed: Mar. 8, 2022

(65) Prior Publication Data

US 2022/0188485 A1    Jun. 16, 2022

Related U.S. Application Data

(63) Continuation of application No. 16/699,829, filed on Dec. 2, 2019, now Pat. No. 11,379,636.

(Continued)

(51) Int. Cl.
*G06F 30/23*    (2020.01)
*G06F 30/28*    (2020.01)
(Continued)

(52) U.S. Cl.
CPC ............. *G06F 30/23* (2020.01); *G06F 30/28* (2020.01); *G06F 2111/10* (2020.01); *G06F 2113/08* (2020.01)

(58) Field of Classification Search
CPC ...... G06F 30/23; G06F 30/28; G06F 2111/10; G06F 2113/08; G06F 2111/08; G06F 30/25
See application file for complete search history.

(56) References Cited

U.S. PATENT DOCUMENTS 5,848,260 A      12/1998   Chen et al.
6,089,744 A *    7/2000    Chen ..................... G06F 30/23
                                                          703/2
(Continued)

FOREIGN PATENT DOCUMENTS

JP    2015-507778    3/2015
JP    2016-528628    9/2016
(Continued)

OTHER PUBLICATIONS

Alexander N. Gorban et al., "Methods of Nonlinear Kinetics," Physics, Mathematics pp. 1-49 (Year: 2003).

(Continued)

*Primary Examiner* — Steven W Crabb
(74) *Attorney, Agent, or Firm* — Fish & Richardson P.C.

(57) ABSTRACT

Techniques for simulating fluid flow using a lattice Boltzmann (LB) approach for solving scalar transport equations and solving for total energy are described. In addition to the lattice Boltzmann functions for fluid flow the techniques include modifying a set of state vectors of the particles by adding specific total energy to states of particles that will be advected and subtracting the specific total energy from states of particles that will not be advected over a time interval and performing advection of the particles according to the modified set of states.

20 Claims, 10 Drawing Sheets

Related U.S. Application Data

(60) Provisional application No. 62/790,528, filed on Jan. 10, 2019.

(51) Int. Cl.
*G06F 111/10* (2020.01)
*G06F 113/08* (2020.01)

(56) References Cited

U.S. PATENT DOCUMENTS

| | | | |
|---|---|---|---|
| 6,915,245 | B1 | 7/2005 | Hinton et al. |
| 9,576,087 | B2 | 2/2017 | Chen et al. |
| 2013/0116997 | A1 | 5/2013 | Sun et al. |
| 2013/0151221 | A1* | 6/2013 | Chen ................. G06F 30/23 703/9 |
| 2016/0188768 | A1 | 6/2016 | Gopalakrishnan et al. |

FOREIGN PATENT DOCUMENTS

| | | |
|---|---|---|
| JP | 2016-534436 | 11/2016 |
| WO | WO 1997021195 | 6/1997 |
| WO | WO 1999034309 | 7/1999 |

OTHER PUBLICATIONS

Benzi et al., "The lattice Boltzmann equation: theory and applications," Physics Reports, Dec. 1, 1992, 222(3):145-97.

Bhatnagar et al., "A model for collision processes in gases. I. Small amplitude processes in charged and neutral one-component systems," Physical review, May 1, 1954, 94(3):511-525.

Chen et al., "Discrete rotational symmetry, moment isotropy, and higher order lattice Boltzmann models," Journal of Scientific Computing, Jan. 1, 2008, 34(1):87-112.

Chen et al., "H-theorem and origins of instability in thermal lattice Boltzmann models," Computer Physics Communications, Jul. 1, 2000, 129(1-3):21-31.

Chen et al., "Lattice Boltzmann method for fluid flows," Annual review of fluid mechanics, Jan. 1998, 30(1):329-364.

Chen et al., "Recovery of Galilean invariance in thermal lattice Boltzmann models for arbitrary Prandtl number," International Journal of Modern Physics C, Oct. 15, 2014, 25(10):1-18.

Chikatamarla et al., "Lattices for the lattice Boltzmann method," Physical Review E, Apr. 1, 2009, 79(4):1-18.

d'Humieres, "Multiple-relaxation-time lattice Boltzmann models in three dimensions," Philosophical Transactions of the Royal Society of London, Series A: Mathematical, Physical and Engineering Sciences, Mar. 15, 2002, 360(1792):437-51.

Extended European Search Report in EP Appln. No. 20151045.0, dated May 27, 2020, 12 pages.

Feng et al., "A compressible lattice Boltzmann finite volume model for high subsonic and transonic flows on regular lattices," Computers & Fluids, Jun. 5, 2016, 131:45-55.

Frapolli et al., "Entropic lattice Boltzmann model for compressible flows," Physical Review E, Dec. 28, 2015, 92(6): 1-5.

Guo et al., "Thermal lattice Boltzmann equation for low Mach number flows: decoupling model," Physical Review E, Mar. 14, 2007, 75(3):1-15.

He et al., "A novel thermal model for the lattice Boltzmann method in incompressible limit," Journal of Computational Physics, Oct. 10, 1998, 146(1):282-300.

Khorrami et al., "Simulation-based airframe noise prediction of a full-scale, full aircraft," In 22nd AIAA/CEAS aeroacoustics conference, 2016, 2706:1-17.

Konig et al., "Transonic Lattice Boltzmann Simulations of the NASA-CRM in the European Transonic Windtunnel," In 2018 Applied Aerodynamics Conference, 2018, 1-16.

Li et al., "Coupled double-distribution-function lattice Boltzmann method for the compressible Navier-Stokes equations," Physical Review E, Nov. 16, 2007, 76(5):1-19.

Nie et al., "A lattice-Boltzmann/finite-difference hybrid simulation of transonic flow," In 47th AIAA Aerospace Sciences Meeting Including the New Horizons Forum and Aerospace Exposition, Jan. 2009, 139:1-8.

Shan, "General solution of lattices for Cartesian lattice Bhatanagar-Gross-Krook models," Physical Review E, Mar. 10, 2010, 81(3):1-7.

Sun et al., "Lattice Boltzmann formulation for flows with acoustic porous media," Comptes Rendus—Mecanique, 2015, 343(10):533-544.

Van et al., "Jet noise prediction: validation and physical insight," In 2018 AIAA/CEAS Aeroacoustics Conference, 2018, 3617:1-16.

Watari, "Supersonic flow simulations by a three-dimensional multispeed thermal model of the finite difference lattice Boltzmann method," Physica A: Statistical Mechanics and its Applications, May 15, 2006, 364:129-44.

Yan, "A multi-energy-level lattice Boltzmann model for the compressible Navier-Stokes equations," International Journal for Numerical Methods in Fluids, Sep. 10, 2007, 55(1):41-56.

Zhang et al., "A lattice Boltzmann approach for solving scalar transport equations," Philosophical Transactions of the Royal Society A: Mathematical, Physical and Engineering Sciences, Jun. 13, 2011, 369(1944):2264-73.

Zhang et al., "Efficient kinetic method for fluid simulation beyond the Navier-Stokes equation," Physical Review E, Oct. 12, 2006, 74(4):1-7.

Office Action in Chinese Appln. No. 202010026293.6, mailed on Sep. 1, 2023, 41 pages (with Machine translation).

Office Action in Japanese Appln. No. 2020-002949, mailed on Dec. 7, 2023, 6 pages (with English translation).

Office Action in Japanese Appln. No. 2020-002949, mailed on Mar. 25, 2024, 5 pages (with Machine translation).

* cited by examiner

LATTICE BOLTZMANN SOLVER ENFORCING TOTAL ENERGY CONSERVATION

CLAIM OF PRIORITY

This application claims priority to U.S. patent application Ser. No. 16/699,829, filed on Dec. 2, 2019 and entitled "LATTICE BOLTZMANN SOLVER ENFORCING TOTAL ENERGY CONSERVATION," and under 35 USC § 119(e) to U.S. Provisional Patent Application Ser. No. 62/790,528, filed on Jan. 10, 2019 and entitled "LATTICE BOLTZMANN SOLVER ENFORCING TOTAL ENERGY CONSERVATION," the entire contents of which are hereby incorporated by reference.

BACKGROUND

This description relates to computer simulation of physical processes, such as physical fluid flows.

The so called "Lattice Boltzmann Method" (LBM) is an advantageous technique for use in computational fluid dynamics. The underlying dynamics of a lattice Boltzmann system resides in the fundamental physics of kinetic theory that involves motion of many particles according to the Boltzmann equation. There are two fundamental dynamical processes in a basic Boltzmann kinetic system—collision and advection. The collision process involves interactions among particles obeying conservation laws and to relax to an equilibrium. The advection process involves modeling movement of particles from one location to another according to the particles microscopic velocities.

For compressible flows, in order to satisfy conservation of mass, momentum and total energy typically a single distribution functions is used. If a single distribution function is used to solve all three quantities, the lattice used for LBM should satisfy moments up to the eighth order. In this situation, a large number of lattice velocities are required as the moment requirements increase and a resulting stencil size increases as well. Other considerations involved with using a single particle distribution function, include distribution function stability, boundary conditions for both momentum and energy, considerations with respect to body force and heat source, and so forth.

SUMMARY

According to an aspect, a method for simulating fluid flow on a computer, with the simulation enforcing total energy conservation, includes simulating activity of a fluid across a mesh, the activity of the fluid being simulated so as to model movement of particles across the mesh, storing, in a computer accessible memory, a set of state vectors for each mesh location in the mesh, each of the state vectors comprising a plurality of entries that correspond to particular momentum states of possible momentum states at a corresponding mesh location, calculating by the computer, a set of energy values for the mesh locations in the mesh, performing by the computer for a time interval, an advection of the particles to subsequent mesh locations, and modifying by the computer, the state vectors of the particles by adding specific total energy values to states of particles that were advected and subtracting the specific total energy values from states of particles that were not advected over the time interval.

Aspects also include computer program products on one or more machine-readable hardware storage devices, apparatuses, and computing systems.

One or more of the above aspects may include amongst features described herein one or more of the following features.

Subsequent to an advection of the particles to subsequent mesh locations according to the modified set of states, the aspect includes adding back to the particle states a local pressure term before computing moments to provide a proper pressure gradient ($\nabla p$). The local pressure term includes $\theta$-1 terms that are calculated by the computer. Simulating activity of the fluid flow comprises simulating the fluid flow based in part on a first set of discrete lattice speeds; and the method further includes simulating time evolution of a scalar quantity based in part on a second set of discrete lattice speeds. The second set of discrete lattice speeds are the same lattice speeds as the first set of discrete lattice speeds. The second set of discrete lattice speeds are different in number of lattice speeds as a number of the first set of discrete lattice speeds. Simulating the time evolution of total energy includes collecting incoming distributions from neighboring mesh locations for the collision and energy operators, weighting the incoming distributions, determining outgoing distributions as a product of the collision and energy operators, and propagating the determined outgoing distributions.

Simulating the time evolution of the scalar quantity includes simulating the time evolution of the scalar quantity based in part on a collision operator that effectively expresses a momentum flux that results from the product of the collision and energy operators as a first order term. To recover exact shear stress for an arbitrary Prandtl number the energy collision term is given by $$q_i^l(x,t) = q_i^{eq}(x,t) + \left(1 - \frac{1}{\tau_q}\right)\left[\left(\frac{c_i - v}{\rho RT}\right)\cdot\left(\prod_q - \frac{vv}{RT+v^2}:\prod_q\right)\right] + \left[\left(\frac{1}{\tau_q} - \frac{1}{\tau}\right)\left(\frac{c_i-v}{\rho RT}\right)\cdot\left(v\cdot\prod\right)\right]$$

where $\Pi = \Sigma_i c_i c_i (f_i - f_i^{eq})$ is the filtered second order moment of non-equilibrium component.

The aspect further includes applying a zero net surface flux boundary condition such that the incoming distributions are equal to the determined outgoing distributions. Determining the outgoing distributions includes determining the outgoing distributions to provide a zero surface scalar flux. The scalar quantity comprises a scalar quantity selected from the group consisting of temperature, concentration, and density. Calculating the set of energy values for the mesh locations in the mesh includes calculating total energy $E_t$ given by $E_t = E + v^2/2$, where $E_t$ refers to specific total energy, which is total energy divided by mass, E is specific internal energy, and v is the velocity.

Simulating activity includes applying by the computer an equilibrium distribution and a second distribution function for specific total energy $E_t$, with the second distribution defined as a specific scalar that is advected along with the flow distribution $f_i$. The second distribution function accounts for the non-equilibrium contribution of $f_i$ to the energy equation to obtain correct flow behavior near boundaries and across different grid resolutions wherein collision operators for distribution functions are given by:

$$f_i^1(x,t) = f_i(x,t) + \Omega_f[f_i(x,t), f_i^{eq}(x,t)]$$

$$q_i^l(x,t) = q_i(x,t) + \Omega_q[f_i(x,t), f_i^{eq}(x,t), q_i(x,t), q_i^{eq}(x,t)]$$

where terms $\Omega_f$, $\Omega_q$ represent respective collision operators; and equilibrium distributions used in the above equations are:

$$f_i^{eq} = \rho \omega_i [1 + \xi \cdot u + \frac{(\xi \cdot u)^2 - u^2}{2} + \frac{(\xi \cdot u)^3 - 3(\xi \cdot u)u^2}{6}$$

$$q_i^{eq} = E_t = E + v^2/2.$$

The total energy adds the term prior to advection, so that pressure is convected and to compensate for added energy the energy is removed from stop states. Removing the added energy conserves total energy and provides the correct pressure velocity term. Removing the added energy is provided by modifying the stop state $\tilde{q}_0(x,t)$ such that $$\sum_i \tilde{f}_i \tilde{q}_i = \rho \left( E + \frac{u^2}{2} \right).$$

In the techniques disclosed herein, solving total energy uses a second distribution that is defined as a specific scalar that is advected along with the flow distribution. The techniques described herein for simulating fluid flow use a lattice Boltzmann (LB) approach and scalar solver transport equations. A LBM solver for compressible flows that has total energy conservation and with higher stability range is provided that can be used for real world applications. The equilibrium distribution employed in the solver is positive during collision and temperature coupling is carried out during advection.

Other features and advantages will be apparent from the following description, including the drawings, and the claims.

DESCRIPTION

Figure 1:
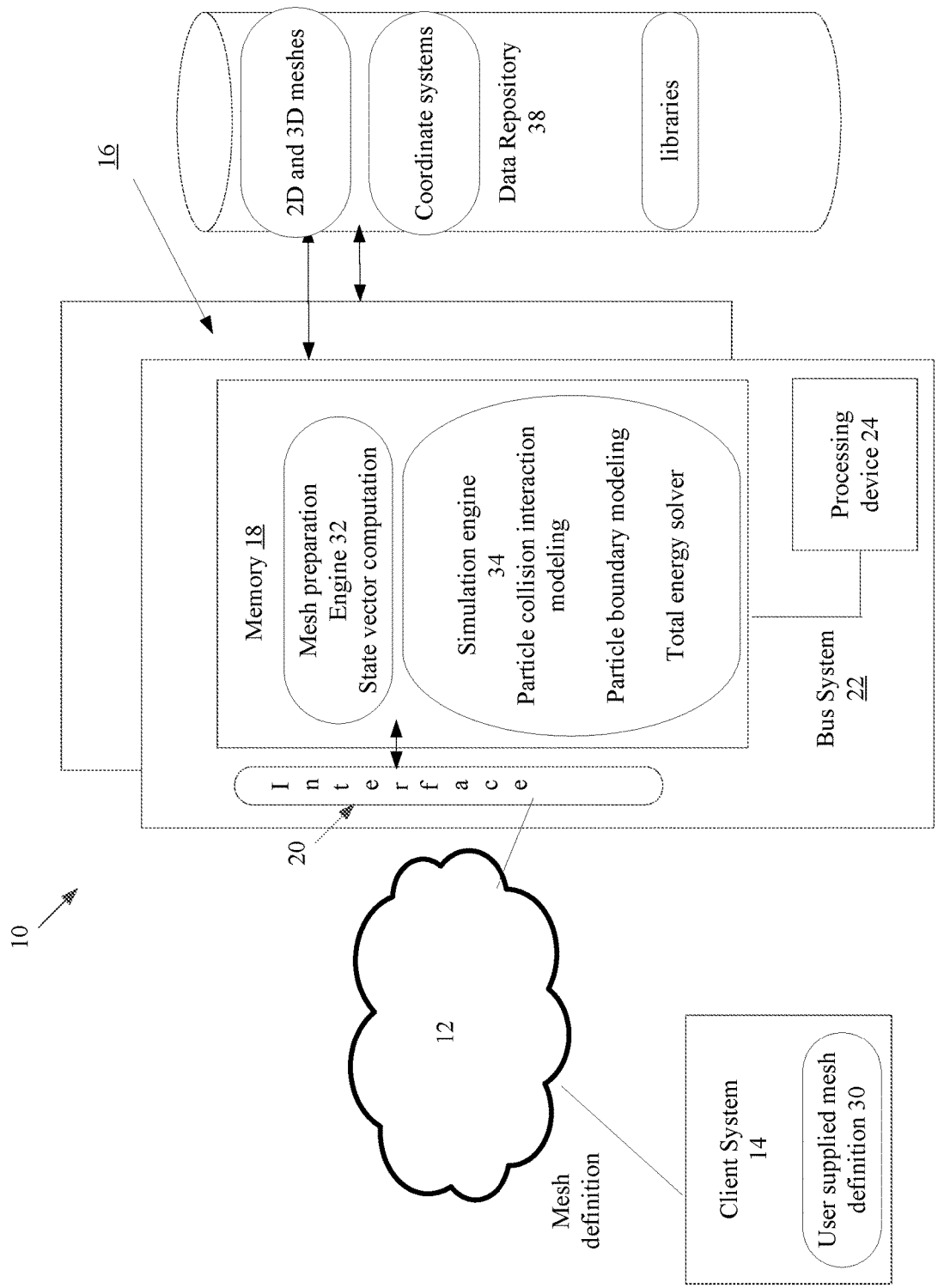
FIG. 1 depicts a system for fluid flow simulation.

In the procedure discussed in FIG. 9 below, a flow simulation process is described using the Lattice Boltzmann Solver enforcing total energy conservation.

In FIGS. 7, 8 and 10-18 those figures are each labeled "prior art." These figures are labeled prior art as these figures generally appear in the above referenced patent. However, these figures as they appear in the above referenced patent application. However, these figures do not take into consideration any modifications that would be made to a flow simulation using the Lattice Boltzmann Solver enforcing total energy conservation, described below, because that LB solver is not described in the above referenced patent application.

A. Approach to Solving for Scalar Quantities

When completing complex fluid flow simulations it can be beneficial to concurrently solve scalar quantities such as temperature distribution, concentration distribution, and/or density in conjunction with solving for the fluid flow. In the systems and methods described herein, modeling of the scalar quantities (as opposed to vector quantities) is coupled with the modeling of the fluid flow based on a LBM-based physical process simulation system. Exemplary scalar quantities that can be modeled include temperature, concentration, and density.

Specific details of techniques to couple modeling of scalar quantities with simulation fluid flow are detailed in co-pending US Patent Publication US-2016-0188768-A1, by Pradeep Gopalakrishnan, et al. entitled: "Temperature Coupling Algorithm for Hybrid Thermal Lattice Boltzmann Method," the entire contents of which are incorporated herein by reference. A collision operator is used that is based on Galilean-invariant collision operator that has a relatively high stability range. Specific details of the collision operator are detailed in U.S. Pat. No. 9,576,087 the entire contents of which are incorporated herein by reference.

For example, the system can be used to determine a convective temperature distribution within a system. For example, if a system (formed of a volume represented by multiple voxels) includes a source of heat and there is air flow within the system, some areas of the system will be warmer than others based on the air flow and proximity to the heat source. In order to model such a situation, the temperature distribution within the system can be represented as a scalar quantity with each voxel having an associated temperature.

In another example, the system can be used to determine a chemical distribution within a system. For example, if the system (formed of the volume represented by multiple voxels) includes a source of a contaminant such as a dirty bomb or chemical or other particulate suspended in either air or liquid and there is air or liquid flow within the system, some areas of the system will have a higher concentration than others based on the flow and proximity to the source. In order to model such a situation, the chemical distribution within the system can be represented as a scalar quantity with each voxel having an associated concentration.

In some applications, multiple different scalar quantities can be simulated concurrently. For example, the system can simulate both a temperature distribution and a concentration distribution in a system.

The scalar quantities may be modeled in different ways. For example, a lattice Boltzmann (LB) approach for solving scalar transport equations can be used to indirectly solve for scalar transport. For example, the methods described herein can provide an indirect solution of the following second order macroscopic scalar transport equation:

$$\frac{\partial \rho T}{\partial t} + \nabla \cdot (\rho u T) = \nabla \cdot \rho \kappa \nabla T$$

In addition to the lattice Boltzmann functions for fluid flow, a second set of distribution functions is introduced for transport scalars. This approach assigns a vector to each voxel in a volume to represent the fluid flow and a scalar quantity to each voxel in the volume to represent the desired scalar variable (e.g., temperature, density, concentration, etc.). This approach fully recovers the macroscopic scalar transport equation satisfying an exact conservation law. This approach is believed to increase the accuracy of the determined scalar quantities in comparison to other, non-LBM methods. Additionally, this approach is believed to provide enhanced capability to account for complicated boundary shapes.

This approach for modeling scalar quantities may be used in conjunction with a time-explicit CFD/CAA solution method based on the Lattice Boltzmann Method (LBM), such as the PowerFLOW system available from Exa Corporation of Burlington, Massachusetts. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A general discussion of a LBM-based simulation system is provided below and followed by a discussion of a scalar solving approach that may be used in conjunction with fluid flow simulations to support such a modeling approach.

Model Simulation Space

In a LBM-based physical process simulation system, fluid flow is represented by the distribution function values $f_i$, evaluated at a set of discrete velocities $c_i$. The dynamics of the distribution function is governed by Equation I1 where $f_i(0)$ is known as the equilibrium distribution function, defined as:

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \quad \text{Eq. (I1)}$$

where $u_\alpha = c_i \cdot \frac{u}{T}$

This equation is the well-known lattice Boltzmann equation that describes the time-evolution of the distribution function, $f_i$. The left-hand side represents the change of the distribution due to the so-called "streaming process." The streaming process is when a pocket of fluid starts out at a mesh location, and then moves along one of plural velocity vectors to the next mesh location. At that point, the "collision factor," i.e., the effect of nearby pockets of fluid on the starting pocket of fluid, is calculated. The fluid can only move to another mesh location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator is of the Bhatnagar, Gross and Krook (BGK) operator. The collision operator forces the distribution function to go to the prescribed values given by the second equation, which is the "equilibrium" form.

The BGK operator is constructed according to the physical argument that, no matter what the details of the collisions, the distribution function approaches a well-defined local equilibrium given by $\{f_i^{eq}(x,v,t)\}$ $\{f^{eq}(x,v,t)\}$ via collisions:

$$C = -\frac{1}{\tau}(f - f^{eq}), \quad \text{Eq. (I2)}$$

where the parameter $\tau$ represents a characteristic relaxation time to equilibrium via collisions. Dealing with particles (e.g., atoms or molecules) the relaxation time is typically taken as a constant.

From this simulation, conventional fluid variables, such as mass $\rho$ and fluid velocity u, are obtained as simple summations in Equation (I3).

$$\rho(x, t) = \sum_i f_i(x, t); \; \rho u(x, t) = \sum_i c_i f_i(x, t); \quad \text{Eq. (I3)}$$

$$DT(x, t) = \sum_i (c_i - u)^2 f_i(x, t)$$

where $\rho$, u, and T are, respectively, the fluid density, velocity and temperature, and D is the dimension of the discretized velocity space (not necessarily equal to the physical space dimension).

Due to symmetry considerations, the set of velocity values are selected in such a way that they form certain lattice structures when spanned in the configuration space. The dynamics of such discrete systems obeys the LBE having the form $$f_i(x+c_i,t+1) - f_i(x,t) = C_i(x,t)$$

where the collision operator usually takes the BGK form as described above. By proper choice of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined by Equation (I3) above.

The collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken. In a fluid system, a small disturbance of the density travels at the speed of sound. In a gas system, the speed of sound is generally determined by the temperature. The importance of the effect of compressibility in a flow is measured by the ratio of the characteristic velocity and the sound speed, which is known as the Mach number. For a further explanation of conventional LBM-based physical process simulation systems the reading is referred to the above incorporated by reference application US-2016-0188768-A1.

Referring to FIG. 1, a system 10 for simulating a fluid flow, e.g., about a representation of a physical object is shown. The system 10 in this implementation is based on a client-server architecture and includes a server system 12 implemented as a massively parallel computing system 12 and a client system 14. The server system 12 includes memory 18, a bus system 11, interfaces 20 (e.g., user interfaces/network interfaces/display or monitor interfaces, etc.) and a processing device 24. In memory 18, are a mesh preparation engine 32 and a simulation engine 34. The system 10 accesses a data repository 38 that stores 2D and/or 3D meshes, coordinate systems, and libraries.

While FIG. 1 shows the mesh preparation engine 32 in memory 18, the mesh preparation engine can be a third party application that is executed on a different system than server 12. Whether the mesh preparation engine 32 executes on in memory 18 or is executed on a different system than server 12, the mesh preparation engine 32 receives a user-supplied mesh definition 30 and the mesh preparation engine 32 prepares a mesh and sends the prepared mesh to the simulation engine 34. The simulation engine 34 includes a particle collision interaction module, a particle boundary model module and advection module that performs advection operations, as disclosed below. The simulation engine 34 also includes a total energy solver as discussed below in FIG. 3.

Figure 2:
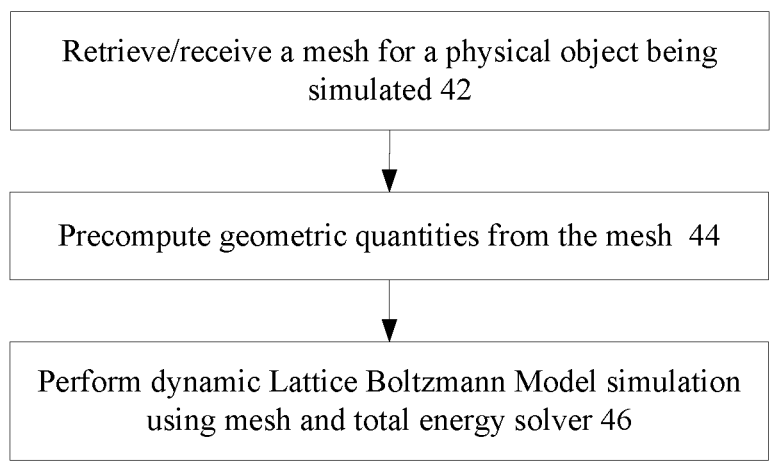
FIGS. 2-3 depict flow charts showing operations for complex fluid flow simulations and calculation of total energy.

Referring now to FIG. 2, a process 40 for simulating fluid flow about a representation of a physical object is shown. In the example that will be discussed herein, the physical object is an airfoil. The use of an airfoil is merely illustrative however, as the physical object can be of any shape, and in particular can have planar and/or curved surface(s). The process receives, e.g., from client system 14 or by retrieval from the data repository 42, a mesh for the physical object being simulated. In other embodiments, either an external system or the server 12 based on user input, generates the mesh for the physical object being simulated. The process precomputes 44 geometric quantities from the retrieved mesh and performs 46 dynamic Lattice Boltzmann Model simulation using the precomputed geometric quantities corresponding to the retrieved mesh. Lattice Boltzmann Model simulation includes the simulation of evolution of particle distribution and advection of particles to a next cell q in the LBM mesh according to a modified set of state vectors by adding specific total energy values to states of particles that were advected and subtracting the specific total energy values from states of particles that were not advected over a time interval.

Total Energy Conserving Compressible Flow Solver

When completing complex fluid flow simulations it can be beneficial to concurrently solve scalar quantities such as temperature distribution, concentration distribution, and/or density in conjunction with solving for the fluid flow. Distinguishing between specific scalar vs. scalar distribution, which is the difference between q (eq. 10) and h (eq. 2) and using the specific scalar q that is E_t while h is density*E_t. The approach discussed is as a scalar sitting on top of a flow that is advected, as discussed in US Patent Publication US-2016-0188768-A1, mentioned above.

Treatment of Pressure Term in Total Energy Conservation

Figure 3:
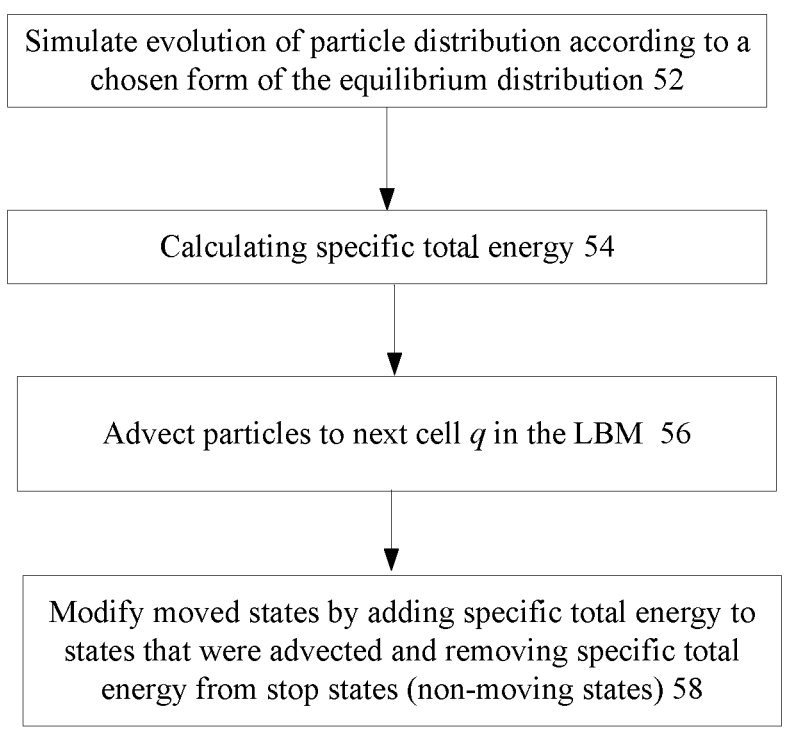

Referring now to FIG. 3, a compressible LBM solver with total energy conservation process 50 that has better stability range than prior approaches, and which is applicable for real world applications is now described. The total energy conservation equation that needs to be solved is given by:

$$\frac{\delta(\rho E_t)}{\delta t} + \nabla \cdot [(\rho E_t + p)] = \nabla \cdot [k \nabla T] + \nabla \cdot [v \cdot \tau]$$ Eq. 1 where the total energy $E_t$ is given by $E_t = E + v^2/2$, $\rho$ is the density, v is the velocity, p is the pressure, k is the thermal conductivity, T is the temperature, and $\tau$ is the shear stress. This is a general equation that needs to be solved by all computational fluid dynamic tools for high speed flows.

One of the complexities involved with the total energy solver is the addition of pressure convection term "p" in Equation 1. As with all computational fluid dynamic tools for high speed flows, the Lattice Boltzmann Method (LBM) has to solve this equation for total energy conservation. LBM methods have some drawbacks in solving this equation for all cases in particular for the pressure convection term p. The disclosed method is capable of solving this for complex problems and has other advantages.

The pressure convection issue as it exists for LBM methods can be explained as follows: A normal scalar transport has the form of the following equation $$\frac{\partial S}{\partial t} + u \cdot \nabla S = \nabla(vS)$$

The left hand side of the above equation includes convection terms and the right hand side of this equation has diffusion terms. Unlike total energy equation, all terms in above equation involve only one scalar variable S, which makes the advection simpler. The process 50 simulates 52 evolution of particle distribution according to a chosen form of the equilibrium distribution.

In addition to the equilibrium distribution (chosen form of Equation 1) 52, a second distribution function for calculating specific total energy $E_t$ is used 54. The process 50 includes advection 56 of particles to next cell q in the LBM. Satisfaction of the conservation of energy is provided by a product of the two distributions. The product of these distribution functions is defined as a specific scalar that is advected along with the flow distribution $f_i$. This second distribution function accounts for the non-equilibrium contribution of $f_i$ to the energy equation to obtain correct flow behavior near boundaries and across different grid resolutions, unlike existing methods that use second distribution function independently to solve energy.

The collision operators for the distribution functions are given by:

$$f_i'(x,t) = f_i(x,t) + \Omega_f[f_i(x,t), f_i^{eq}(x,t)]$$ Eq. 2

$$q_i'(x,t) = q_i(x,t) + \Omega_q[f_i(x,t), f_i^{eq}(x,t), q_i(x,t), q_i^{eq}(x,t)]$$ Eq. 3

The terms $\Omega_f$, $\Omega_g$ in Eq. 2 and Eq. 3 are used to represent the respective collision operators. The collision operator $\Omega_f$ in Eq. 5 is discussed extensively in U.S. Pat. No. 9,576,087, the entire contents of which are incorporated herein by reference. The equilibrium distributions used in the above equations are:

$$f_i^{eq} = \rho \omega_i [1 + \xi \cdot u + \frac{(\xi \cdot u)^2 - u^2}{2} + \frac{(\xi \cdot u)^3 - 3(\xi \cdot u)u^2}{6}$$ Eq. 4

$$q_i^{eq} = E_t = E + v^2/2$$

where $q_i^{eq}$ is an equilibrium specific total energy distribution function $q_i^{eq} = E_t = E + v^2/2$, $E_t$ refers to specific total energy, which is total energy divided by mass, E is specific internal energy and v is the velocity, x is the lattice location within a volume, t is a particular point in time, i is an index number of lattice velocities in the lattice velocity set, and $q_i'(x, t)$ is a post collision specific total energy distribution, $f_i(x, t)$ is a distribution function $f_i^{eq}(x, t)$ is an equilibrium distribution function, $\omega_i$ is a lattice weight, and $\xi_i$ and u are nondimensionalized lattice and flow velocity, respectively. The velocities are normalized by square root of lattice temperature $T_0$.

An observation that is apparent in the above formulation of a distribution function Eq. 7 for total energy solver is that the equilibrium distribution does not involve pressure terms (p) as in equation 1, and θ-1 terms, p=ρRT, which is essential for thermal flows. The second distribution is specific total energy which is summation of internal energy $E=C_vT$ and kinetic energy $v^2/2$.

Hence this distribution function will always provide positive values during collision operations and therefore this distribution function provides a solver with corresponding high stability. When the states after collision in Eqn. (2) are advected as it is, the distribution function of eq. 4 will only result in isothermal pressure gradients in momentum but no pressure convection terms in the total energy equation. The pressure gradient and pressure convection terms arise due to advection while collision does not impact these terms, in contrast with other approaches that use the equilibrium distribution and that includes a pressure term during both advection and collision as shown below.

$$f_i^{eq} = \rho\omega_i[1 + \xi \cdot u + \frac{(\xi \cdot u)^2 - u^2}{2} +$$

$$\frac{(\xi \cdot u)^3 - 3(\xi \cdot u)u^2}{6} + \frac{\theta-1}{2}[(\xi^2 - D) + (\xi \cdot u)(\xi^2 - D - 2)]$$

$$h_i^{eq} = f_i^{eq}E + p\omega_i\left[\xi \cdot u + [\xi \cdot u]^2 - u^2 + \frac{\theta}{2}(\xi^2 - D)\right]$$

The term $\theta=RT/T_0$ corresponds to pressure and makes the above equilibrium negative and thus existing techniques are highly unstable. Also note that the second distribution function $h_i^{eq}$ is used independently for total energy, which results in noise across different grid resolutions.

The processing 50 modifies 58 advected states by adding specific total energy to states that were advected, while removing specific total energy from stop states (non-moving states).

More specifically, in this modification 58 in order to recover the correct momentum and energy equations, introduction of pressure is done only during advection step. The moving states ($\forall i \neq 0$) values at mesh sites are modified before the advection process, as in equation 8, below:

$$\forall_{i \neq 0} \tilde{f}_i(x, t) = f_i'(x, t) + \rho(x, t)[\theta(x, t) - 1] \qquad \text{Eq. 5}$$

$$\forall_{i \neq 0} \tilde{q}_i(x, t) = q_i'(x, t) + \frac{p}{\rho}$$

However, adding this term (the second equation in Eq. 5) to $q_i$ also adds additional energy to the moving states. In order to compensate for added energy represented by this term, the same amount of energy is removed from stop state (the state at which particles do not convect). By doing the process has conserved energy and provided the correct pressure velocity term. Specifically, the conservation of the total energy is provided by modifying the stop state $\tilde{q}_0(x,t)$ such that $$\sum_i \tilde{f}_i\tilde{q}_i = \rho\left(E + \frac{v^2}{2}\right).$$

After advection, the local pressure term is added back to the particle states before computing moments thus resulting in a proper pressure gradient ($\nabla p$).

$$\forall_{i \neq 0}\tilde{f}_i(x,t,+dt)=\tilde{f}_i(x-c_i,t)-\rho(x,t)[\theta(x,t)-1] \qquad \text{Eq. 6}$$

The modification before advection (Eq. 8) and after advection (Eq. 6) recovers correct equation of state (or correct pressure gradient $\nabla p$) for momentum and also it recovers correct pressure convection terms $\nabla(up)$ for total energy. Since pressure term is removed (Eq. 9), the states becomes positive during collision and improves stability range of the total energy solver.

The total energy modification to advection in which the computer modifies state vectors of the particles by adding specific total energy values to states of particles that were advected and subtracting the specific total energy values from states of particles that were not advected over the time interval is applied to modify advection as discussed in FIG. 9, below.

Regularized Collision Operator for Energy

The collision operator $\Omega_f$ used for flow states, is discussed in the above mentioned U.S. Pat. No. 9,576,087. Discussed below is the collision operator $\Omega_q$ employed for energy. A regularized collision with a first order moment is given as:

$$q_i'(x, t) = q_i^{eq}(x, t) + \left(1 - \frac{1}{\tau_q}\right)\left[\left(\frac{c_i - v}{\rho RT}\right) \cdot \prod_q\right] \qquad \text{Eq. 7}$$

$$\prod_q = \left[\sum_i c_i\tilde{f}_i(x - c_i, t-1)\tilde{q}_i(x - c_i, t-1)\right] - \rho v(p + E_t)$$

where Eq. 7 is the filtered non-equilibrium contribution to the total energy. The energy conservation is satisfied by multiplication of the two states, which makes the collision term, second term $\Sigma_i \tilde{f}_i\tilde{q}_i$ on the right hand side of Eqn. (7) as:

$$= \tilde{f}_i(x, t)\left(\frac{c_i - v}{\rho RT}\right) \cdot \prod_q \qquad \text{Eq. 8}$$

The zeroth moment of the above term is zero and conserves the energy. During Chapman-Enskog expansion, the first order moment of the collision term is involved in the derivation of thermal diffusion and work done by the shear stress. As a first order approximation, the collision term can be expressed as:

$$\sum_i c_i\tilde{f}_i(x, t)\left(\frac{c_i - v}{\rho RT}\right) \cdot \prod_q \approx \frac{\rho RT\delta + \rho vv}{\rho RT} \cdot \nabla(E_t) \qquad \text{Eq. 9}$$

In the above equation the momentum flux term, $\rho vv$, arises as a result of multiplication of both states, $\tilde{f}_i\tilde{q}_i$. This term $\rho vv$ results in numerical instability for high speed flows and also results in Mach number dependent diffusion. In order to alleviate these effects the term $\rho vv$ is removed by defining the collision operator as $$q_i'(x, t) = q_i^{eq}(x, t) + \left(1 - \frac{1}{\tau_q}\right)\left[\left(\frac{c_i - v}{\rho RT}\right) \cdot \left(\prod_q - \frac{vv}{RT + v^2} : \prod_q\right)\right] \quad \text{Eq. 10}$$

The above expression omits the momentum flux term, $\rho vv$, and improves the numerical stability for high Mach flows.

For collision operator many techniques are available. One of the techniques is called "regularization." In the patent for Lattice Boltzmann based scalar by Hudong and Raoyang (pending) "regularization" together with an additional Galilean invariance feature are used. However, this regularization collision operator is not ideal for use with high speed flows. During derivation the operator ends up having higher order terms such as $\rho vv$ (Eq. 12). For LBM, the velocity values are generally always less than "1" (one), and thus these error terms will be much lower for lower velocity flows and may be negligible. However, for higher speed flows the velocity values will be high of the order of one, so the error term, $\rho vv$, is relatively high and it is removed by Eq. 10.

Viscous Effect for Arbitrary Prandtl Number

The relaxation time used in the energy solver is $\tau_q$, which results in incorrect work done by the shear stress term with viscosity equal to the thermal diffusivity, $(\tau_q - 0.5\rho RT)$. In order to recover exact shear stress for an arbitrary Prandtl number, the following additional term is added to the energy collision term:

$$q_i'(x, t) = q_i^{eq}(x, t) + \left(1 - \frac{1}{\tau_q}\right)\left[\left(\frac{c_i - v}{\rho RT}\right) \cdot \left(\prod_q - \frac{vv}{RT + v^2} : \prod_q\right)\right] + \quad \text{Eq. 11}$$

$$\left[\left(\frac{1}{\tau_q} - \frac{1}{\tau}\right)\left(\frac{c_i - v}{\rho RT}\right) \cdot \left(v \cdot \prod\right)\right]$$

where $\Pi = \Sigma_i c_i c_i (f_i - f_i^{eq})$ is the filtered second order moment of non-equilibrium component, and where $q_i'(x, t)$ is a post collision specific total energy distribution, $q_i^{eq}(x, t)$ is an equilibrium specific total energy distribution, $\tau$ is collision relation time, x is the lattice location within a volume, t is a particular point in time, i is an index number of lattice velocities in a lattice velocity set, T is temperature, $\Pi$ is a non-equilibrium momentum flux, $v$ is a discrete velocity, R is a gas constant, $c_i$ is lattice velocity, and $\rho$ is density.

Total Energy Solver Capabilities

The total energy solver can be included in existing flow solvers, such as PowerFLOW®, and which total energy solver can be used for wide range of industrial applications including application involving high subsonic and transonic flows.

A couple of benchmarks are discussed in this section to show some of the potential advantages of the disclosed total energy solver for compressible flows especially pertaining to the energy conservation aspect. Simulated results are compared against analytical solutions and typical finite difference PDE-based hybrid solver solutions.

Figure 4:
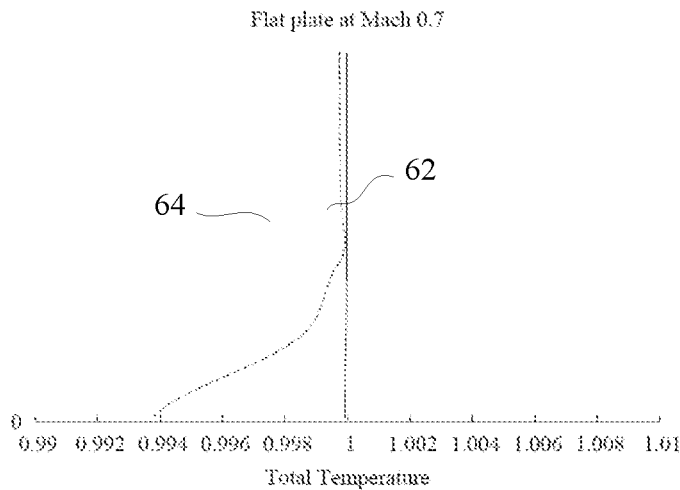
FIGS. 4-6 are illustrative computation based comparisons of expected, predicted results.

FIG. 4 shows a graph for total temperature for a flow over a flat plate at Mach speed (Ma) for Ma=0.7, x=1.5 m from leading edge. As shown in FIG. 4, the total energy solver (solid line 62) for flow over the plate recovers the total temperature exactly while the hybrid solver (LBM flow solver and finite difference based entropy solver) (dashed line 64) fails to maintain the total temperature.

Figure 5:
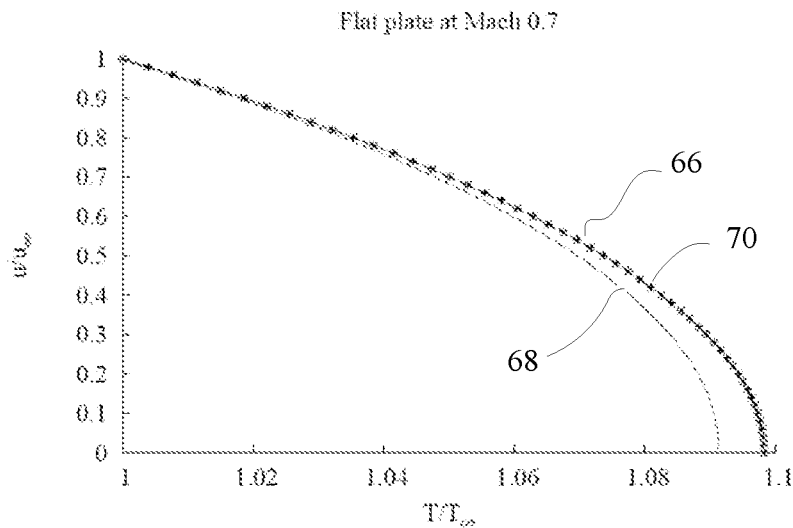

FIG. 5 shows a graph for static temperature for a flat plate at Mach speed (Ma) for Ma=0.7, x=1.5 m from leading edge. The graph plots temperature T, as $T/T_\infty$ (x axis) against u as $u/u_\infty$ (y axis). The disclosed total energy solver represented as a solid line 66 is compared against the hybrid solver (LBM flow solver and finite difference based entropy solver), (dotted line 68). This FIG. 1 illustrates that the static temperature for a flat plate at Mach speed (Ma) for Ma=0.7, x=1.5 m from leading edge matches that for the Walz' equation (asterisk line 70).

Figure 6:
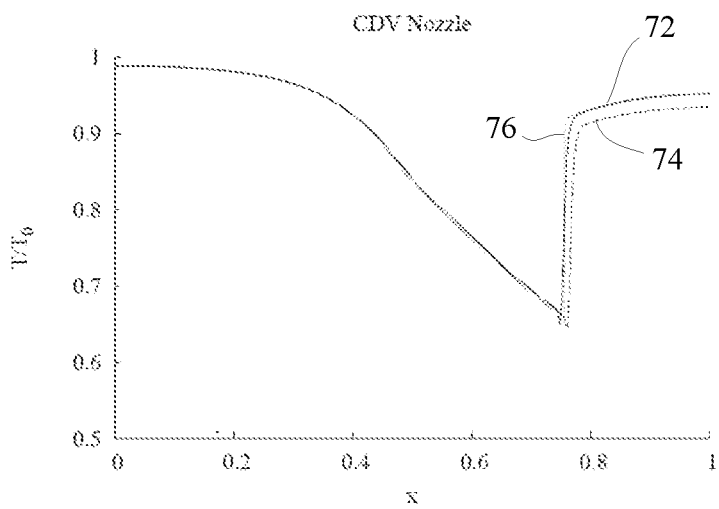

Referring to FIG. 6 a graph for temperature simulation results for a Converging-Diverging Verification (CDV) nozzle for back pressure $P_b=0:75P_t$ are shown. The graph plots temperature T, as $T/T_\infty$ (x axis) against x (y axis). The disclosed total energy solver represented as a solid line 72 is compared against the hybrid solver (LBM flow solver and finite difference based entropy solver), (dotted line 74). The disclosed total energy solver has good agreement with an analytical determined plot dotted line 76. The comparison of static temperature shows that the compressible solver based on finite difference approach fails to recover the temperature after a shock while the disclosed total energy solver achieves the expected value.

The system with disclosed total energy solver can be used to determine a convective temperature distribution within a system. For example, if a system (formed of a volume represented by multiple voxels) includes a source of heat and there is air flow within the system, some areas of the system will be warmer than others based on the air flow and proximity to the heat source. In order to model such a system, the temperature distribution within the system can be represented as a scalar quantity with each voxel having an associated temperature.

In another example, the system can be used to determine a chemical distribution within a system. For example, if the system (formed of the volume represented by multiple voxels) includes a source of a contaminant such as a dirty bomb or chemical or other particulate suspended in either air or liquid and there is air or liquid flow within the system, some areas of the system will have a higher concentration than others based on the flow and proximity to the source. In order to model such a situation, the chemical distribution within the system can be represented as a scalar quantity with each voxel having an associated concentration.

In some applications, multiple different scalar quantities can be simulated concurrently. For example, the system can simulate both a temperature distribution and a concentration distribution in a system.

The scalar quantities may be modeled in different ways. For example, a lattice Boltzmann (LB) approach for solving scalar transport equations can be used to indirectly solve for scalar transport. For example, the methods described herein can provide an indirect solution of the following second order macroscopic scalar transport equation mentioned previously.

$$\frac{\partial \rho T}{\partial t} + \nabla \cdot (\rho u T) = \nabla \cdot \rho \kappa \nabla T$$

In such arrangement simulation, in addition to the lattice Boltzmann functions for fluid flow, a second set of distribution functions is introduced for transport scalars. This approach assigns a vector to each voxel in a volume to represent the fluid flow and a scalar quantity to each voxel in the volume to represent the desired scalar variable (e.g., temperature, density, concentration, etc.). This approach fully recovers the macroscopic scalar transport equation satisfying an exact conservation law. This approach is believed to increase the accuracy of the determined scalar quantities in comparison to other, non-LBM methods. Additionally, this approach is believed to provide enhanced capability to account for complicated boundary shapes.

This approach for modeling scalar quantities may be used in conjunction with a time-explicit CFD/CAA solution method based on the Lattice Boltzmann Method (LBM), such as the PowerFLOW system available from Exa Corporation of Burlington, Massachusetts. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A general discussion of a LBM-based simulation system is provided below and followed by a discussion of a scalar solving approach that may be used in conjunction with fluid flow simulations to support such a modeling approach.

Figure 7:
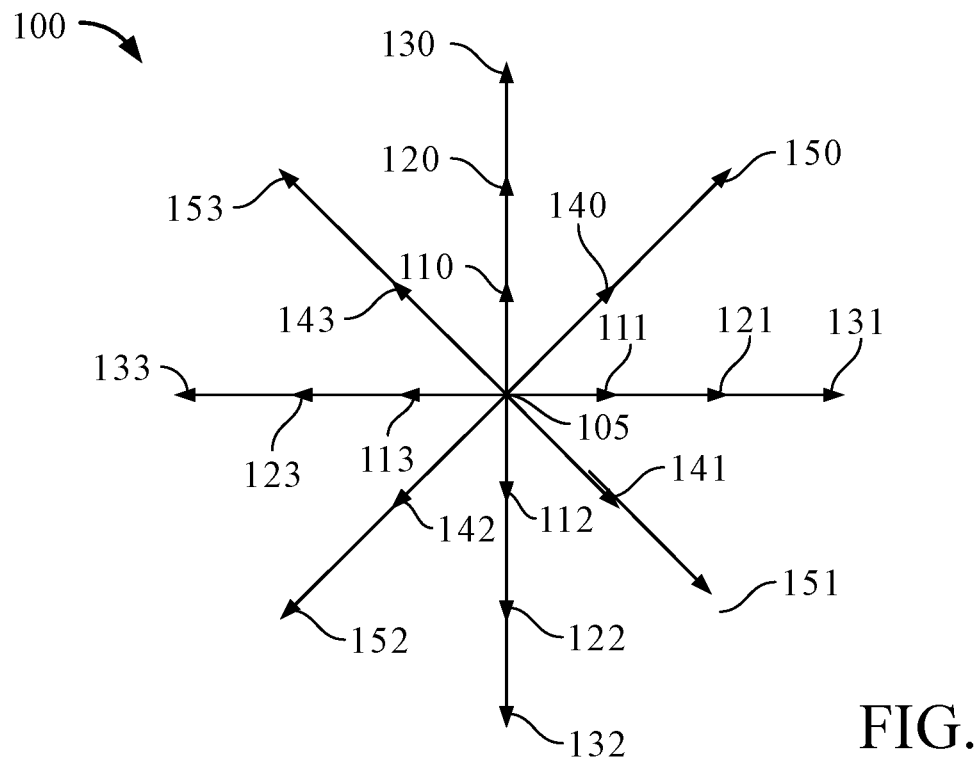
FIGS. 7 and 8 illustrate velocity components of two LBM models (prior art).

Referring to FIG. 7, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 8:
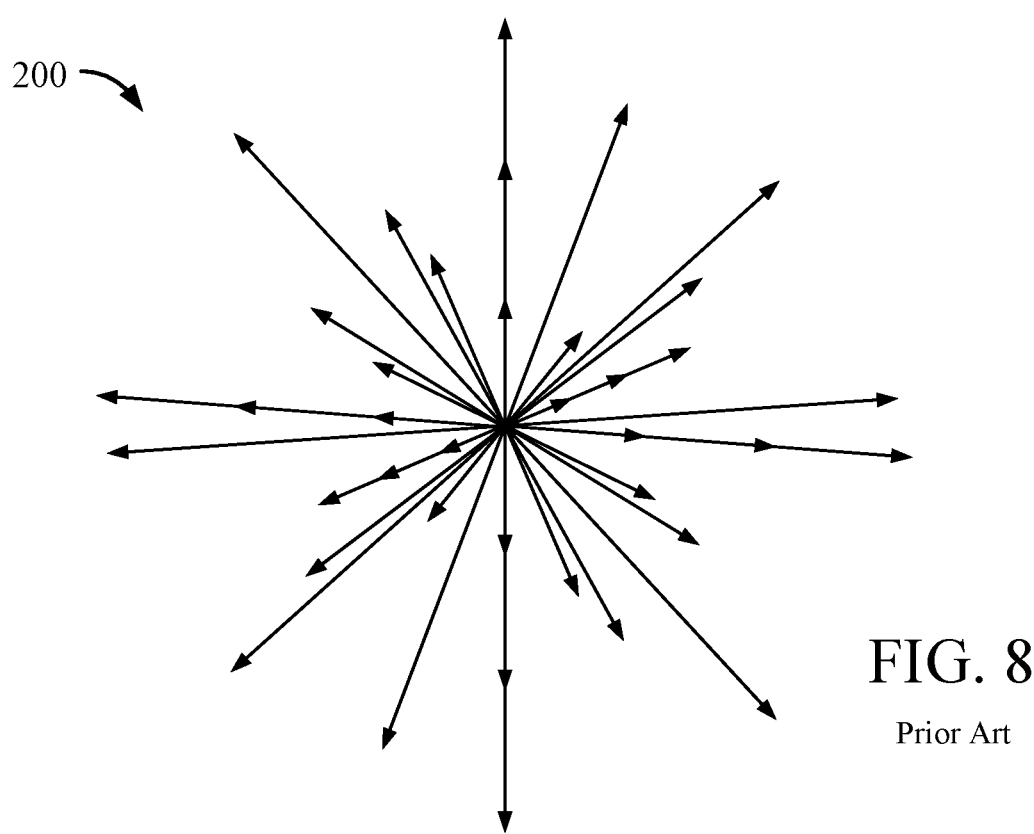

As also illustrated in FIG. 8, a second model (3D-1) 200 is a three-dimensional model that includes 39 velocities, where each velocity is represented by one of the arrowheads of FIG. 8. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 9:
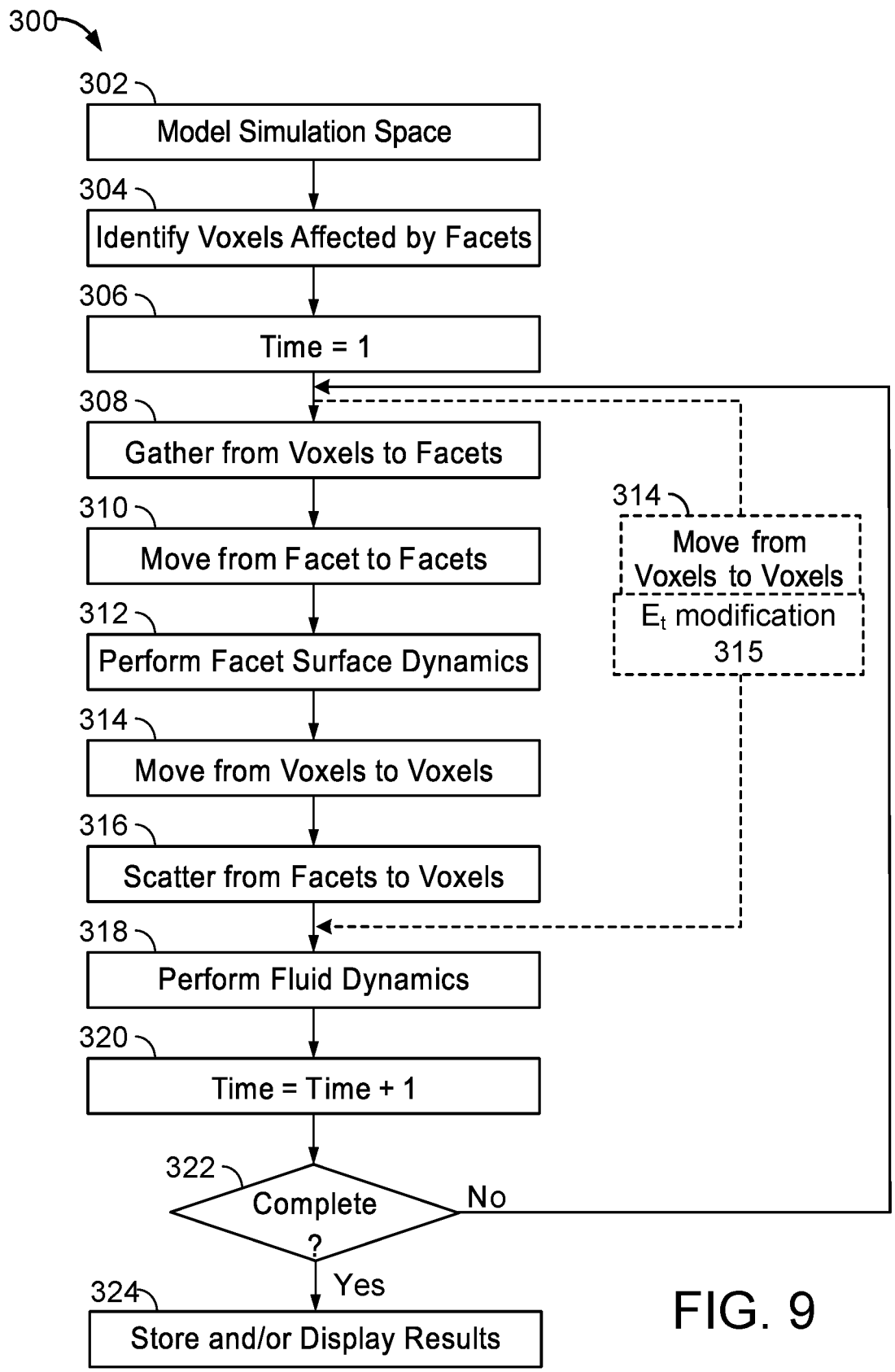
FIG. 9 is a flow chart of a procedure followed by a physical process simulation system.

Referring to FIG. 9, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v \qquad \text{Eq. (14)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x,t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{ix}, c_{iy}, c_{iz}).\qquad\text{Eq. (15)}$$

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector. For total energy, same number of entries (39 states) is used for second distribution, $q_i(x,t)$, to represent specific total energy. Along with state vector $f(x)$, this is used to solve total energy conservation.

Figure 10:
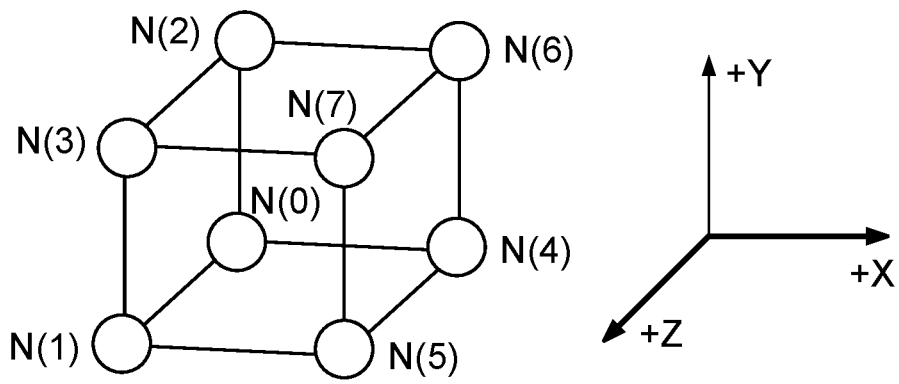
FIG. 10 is a perspective view of a microblock (prior art).

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$. A microblock is illustrated in FIG. 10.

Figure 11A:
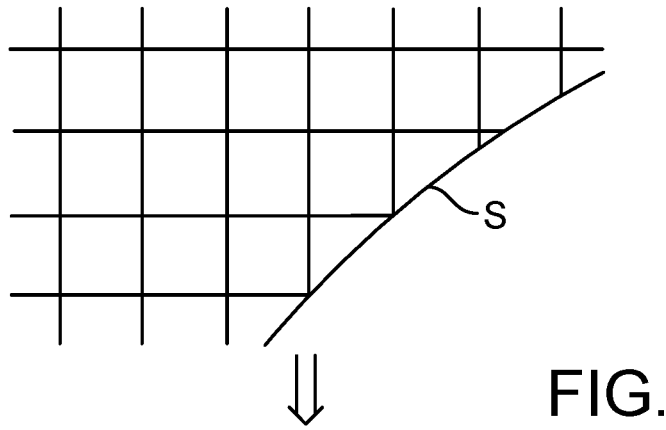
FIGS. 11A and 11B are illustrations of lattice structures (prior art) used by the system of FIG. 1.
Figure 11B:
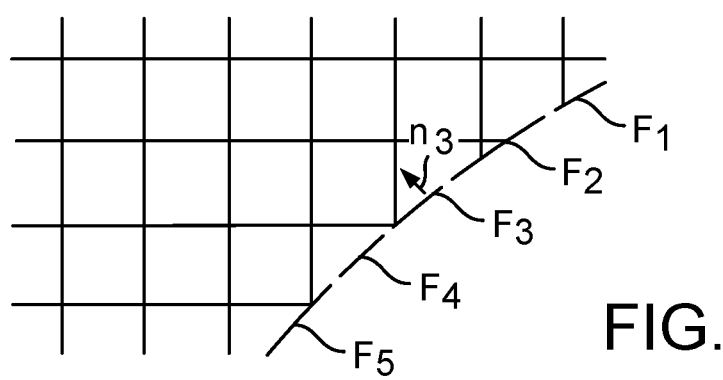

Referring to FIGS. 11A and 11B, a surface S (FIG. 11A) is represented in the simulation space (FIG. 11B) as a collection of facets $F_\alpha$:

$$S = \{F_\alpha\}\qquad\text{Eq. (16)}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet. The total energy distribution function $q_i(\alpha)$ is treated in the same way as the flow distribution for facet and voxel interaction.

Figure 12:
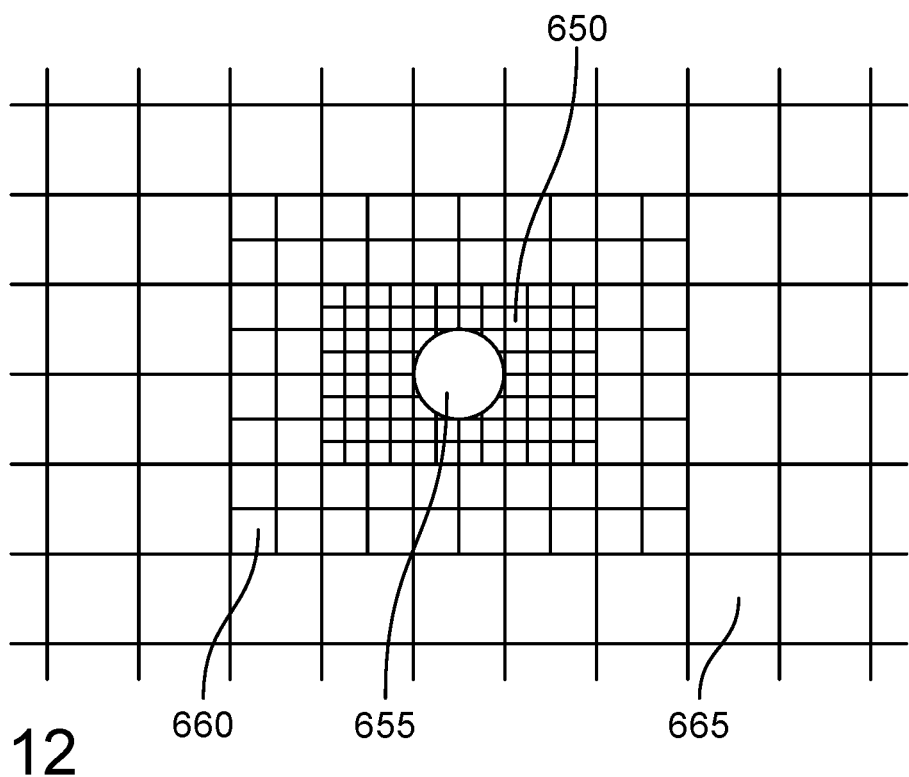
FIGS. 12 and 13 illustrate variable resolution techniques (prior art).
Figure 13:
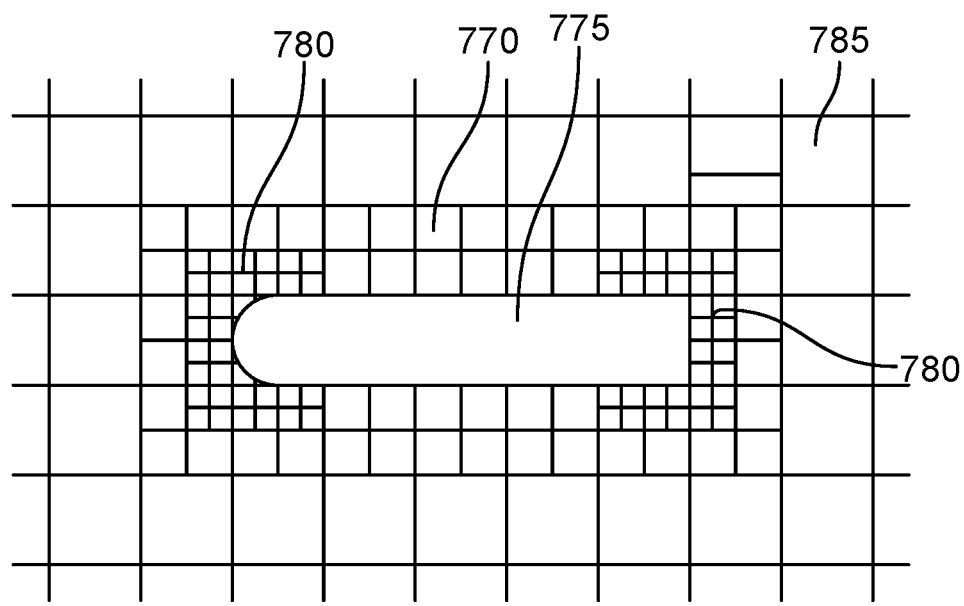

Referring to FIG. 12, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 13, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected by Facets

Referring again to FIG. 9, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 14:
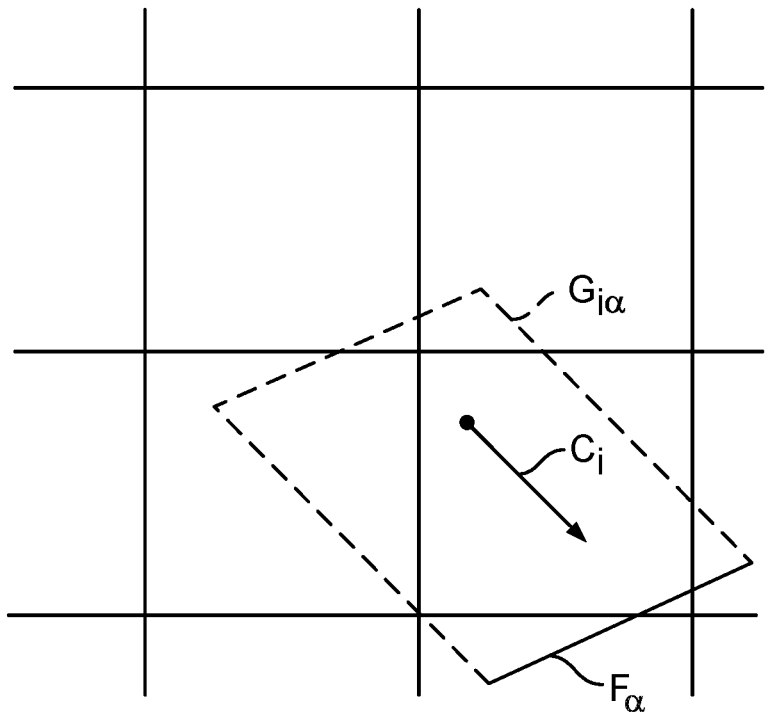
FIG. 14 illustrates a parallelepiped useful in understanding particle interaction with a facet.

Referring to FIG. 14, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha\qquad\text{Eq.(17)}$$

The facet $F_\alpha$ receives particles from the volume $V_{i\alpha}$ when the velocity vector of the state is directed toward the facet ($|c_i n_\alpha| < 0$), and transfers particles to the region when the velocity vector of the state is directed away from the facet ($|c_i n_\alpha| > 0$). As will be discussed below, this expression is modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) + V_{i\alpha}(x).\qquad\text{Eq.(18)}$$

When the parallelepiped $G_{i\alpha}$ is intersected by one or more facets, the following condition is true:

$$V_{i\alpha} = \Sigma V_{i\alpha}(x) + \Sigma V_{i\alpha}(\beta)\qquad\text{Eq.(19)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \quad\quad\quad\text{Eq.(I10)}$$

D. Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet meets four boundary conditions. First, the combined mass of particles received by a facet equals the combined mass of particles transferred by the facet (i.e., the net mass flux to the facet equals zero). Second, the combined energy of particles received by a facet equals the combined energy of particles transferred by the facet (i.e., the net energy flux to the facet equals zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux equals zero and the net normal momentum flux equals the local pressure at the facet. Thus, the components of the combined received and transferred momentums that are perpendicular to the normal $n_\alpha$ of the facet (i.e., the tangential components) are equal, while the difference between the components of the combined received and transferred momentums that are parallel to the normal $n_\alpha$ of the facet (i.e., the normal components) are equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel $N(x)$ and a facet $F_\alpha$ is:

$$\Gamma_{i\alpha}(x) = N_i(x)V_{i\alpha}(x). \quad\quad\quad\text{Eq.(I11)}$$

From this, for each state i directed toward a facet $F_\alpha(c_i n_\alpha < 0)$, the number of particles provided to the facet $F_\alpha$ by the voxels is:

$$\Gamma_{i\alpha V\to F} = \Sigma_X \Gamma_{i\alpha}(X) = \Sigma_X N_i(X)V_{i\alpha}(X) \quad\quad\quad\text{Eq.(I12)}$$

Only voxels for which $V_{i\alpha}(x)$ has a non-zero value need be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 17:
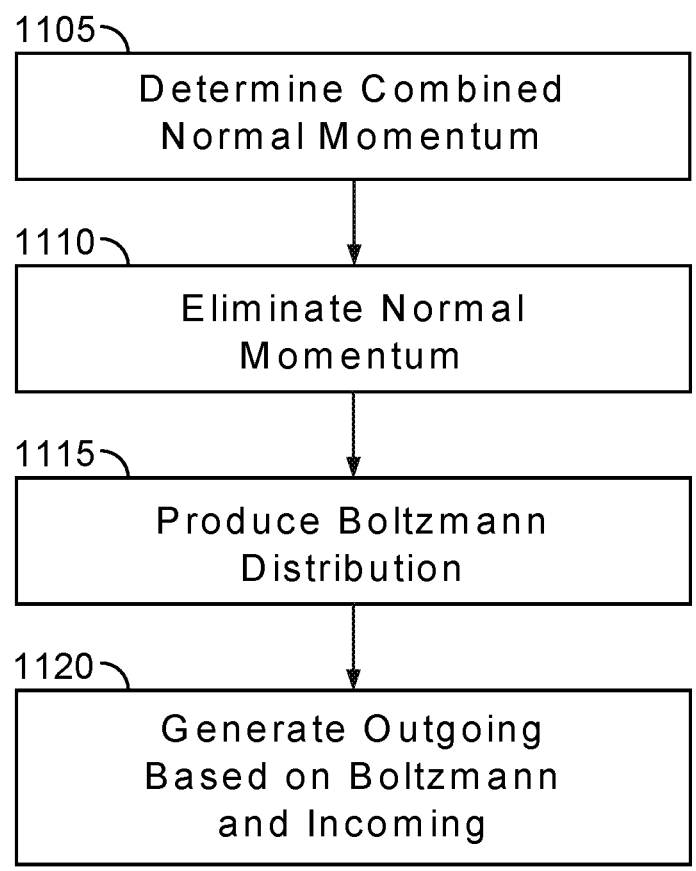
FIG. 17 is a flow chart of a procedure for performing surface dynamics (prior art).

Next, particles are moved between facets (step 310). If the parallelepiped $G_{i\alpha}$ for an incoming state $(c_i n_\alpha < 0)$ of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 17, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta)V_{i\alpha}(V_{i\alpha}(\beta)/V_{i\alpha} \quad\quad\quad\text{Eq.(I.13)}$$

where $\Gamma_i(\beta, t-1)$ is a measure of the state i particles produced by the facet $F_\beta$ during the previous time increment. From this, for each state i directed toward a facet $F_\alpha(c_i n_\alpha < 0)$, the number of particles provided to the facet $F_\alpha$ by the other facets is:

$$\Gamma_{i\alpha F\to F} = \Sigma_\beta \Gamma_{i\alpha}(\beta) = \Sigma_\beta \Gamma_i(\beta, t-1)V_{i\alpha}(\beta)/V_{i\alpha} \quad\quad\quad\text{Eq.(I.14)}$$

and the total flux of state i particles into the facet is:

$$\Gamma_{iIN}(\alpha) = \Gamma_{i\alpha F\to F} + \Gamma_{i\alpha F\to F} = \Sigma_X N_i(x)V_{i\alpha} + \Sigma_\beta \Gamma_i(\beta, t-1)V_{i\alpha}(\beta)/V_{i\alpha} \quad\quad\quad\text{Eq.(I.15)}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha) = \Gamma_{iIN}(\alpha)/V_{i\alpha} \quad\quad\quad\text{Eq.(I.16)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha)/V_{i\alpha} \quad\quad\quad\text{Eq.(I.17)}$$

for $c_i n_\alpha > 0$ wherein $\Gamma_{iOTHER}(\alpha)$ is determined using the technique described above for generating $\Gamma_{iIN}(\alpha)$, but applying the technique to states $(c_i n_\alpha \geq 0)$ other than incoming states $(c_i n_\alpha < 0)$. In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \quad\quad\quad\text{Eq.(I.18)}$$

For parallel states $(c_i n_\alpha = 0)$, both $V_{i\alpha}$ and $V_{i\alpha}(x)$ are zero. In the expression for N, $(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero. The values of states having zero velocity (i.e., rest states and states (0, 0, 0, 2) and (0, 0, 0, -2)) are initialized at the beginning of the simulation based on initial conditions for temperature and pressure. These values are then adjusted over time.

4. Perform Facet Surface Dynamics

Figure 18:
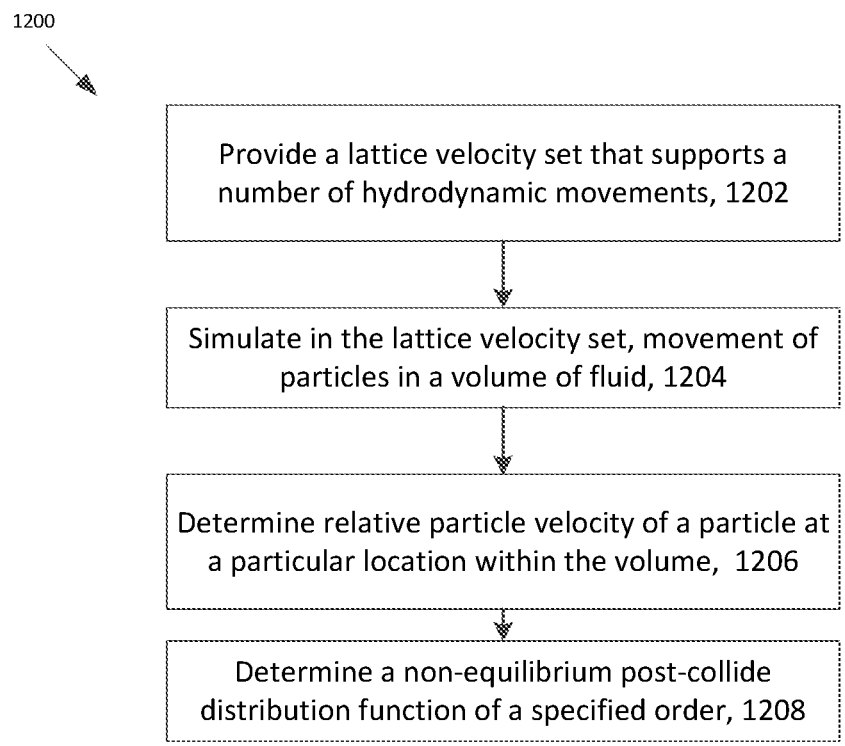
FIG. 18 is a flow chart of a process for generating a distribution function with a thermodynamic step that is independent from a particle collision step (prior art).

Next, surface dynamics are performed for each facet to satisfy the four boundary conditions discussed above (step 312). A procedure for performing surface dynamics for a facet is illustrated in FIG. 18. Initially, the combined momentum normal to the facet $F_\alpha$ is determined (step 1105) by determining the combined momentum $P(\alpha)$ of the particles at the facet as:

$$P(\alpha) = \Sigma_i c_i * N_i^\alpha \quad\quad\quad\text{Eq.(I.19)}$$

for all i. From this, the normal momentum $P_n(\alpha)$ is determined as:

$$P_n(\alpha) = n_\alpha \cdot P(\alpha). \quad \text{Eq.(I.20)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is determined (step 1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha) = \Gamma_{iIN}(\alpha) - N_{n-\beta i}(\alpha) V_{i\alpha} \quad \text{Eq.(I.21)}$$

Using this difference, the outgoing flux distribution is:

$$\Gamma_{iOUT}(\alpha) = N_{n-\beta i}(\alpha) V_{i\alpha} - \Delta\Gamma_{i^*}(\alpha), \quad \text{Eq.(I.22)}$$

for $n_\alpha c_i > 0$ and where $i^*$ is the state having a direction opposite to state i. For example, if state i is (1, 1, 0, 0), then state $i^*$ is (−1, −1, 0, 0). To account for skin friction and other factors, the outgoing flux distribution may be further refined to:

$$\Gamma_{iOUT}(\alpha) = N_{n-Bi}(\alpha) V_{i\alpha} - \Delta\Gamma_{i^*}(\alpha) + C_f(n_\alpha \cdot c_i) - [N_{n-\beta i^*}(\alpha) - N_{n-\beta i}(\alpha)] V_{i\alpha} + (n_\alpha \cdot c_i)(t_{1\alpha} \cdot c_i) \Delta N_{j,1} V_{i\alpha} + (n_\alpha \cdot c_i)(t_{2\alpha} \cdot c_i) \Delta N_{j,2} V_{i\alpha} \quad \text{Eq.(I.23)}$$

for $n_\alpha c_i > 0$, where $C_f$ is a function of skin friction, $t_{i\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \sum_i c_i c_i N_{n-Bi}(\alpha) \cdot t_{1,2\alpha}\right) \quad \text{Eq.(I.24)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha) n_\alpha)/\rho, \quad \text{Eq.(I.25)}$$

where $\rho$ is the density of the facet distribution:

$$\rho = \sum_i N_i(\alpha) \quad \text{Eq.(I.26)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha) V_{i\alpha}. \quad \text{Eq.(I.27)}$$

The outgoing flux distribution then becomes:

$$\Gamma_{iOUT}(\alpha) = N_{n-\beta i}(\alpha) V_{i\alpha} - \Delta\Gamma_{i^*}(\alpha) + C_f(n_\alpha c_i)[N_{n-\beta i^*}(\alpha) - N_{n-\beta i}(\alpha)] V_{i\alpha}, \quad \text{Eq.(I.28)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i, c_i \cdot n_\alpha > 0} c_i \Gamma_{i\alpha OUT} - \sum_{i, c_i \cdot n_\alpha < 0} c_i \Gamma_{i\alpha IN} = \rho_\alpha n_\alpha A_\alpha - C_i \rho_\alpha u_i A_\alpha \quad \text{Eq.(I.29)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i, c_{ji} \cdot n_\alpha < 0} \Gamma_{\alpha jiIN} - \sum_{i, c_{ji} \cdot n_\alpha > 0} \Gamma_{\alpha jiOUT} \quad \text{Eq.(I.30)}$$

where the index j denotes the energy of the state i. This energy difference is then used to generate a difference term:

$$\Delta\Gamma_{\alpha ji} = V_{i\alpha} \Delta\Gamma_{\alpha mj}, \sum_{i, c_{ji} \cdot n_\alpha < 0} V_{i\alpha} \quad \text{Eq.(I.31)}$$

for $c_{ji} n_\alpha > 0$. This difference term is used to modify the outgoing flux so that the flux becomes:

$$\Gamma_{\alpha jiOUTf} = \Gamma_{\alpha jiOUT} + \delta\Gamma_{\alpha ji} \quad \text{Eq.(I.32)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 9, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet.

Also shown is total energy modification 315 to advection in which the computer modifies state vectors of the particles by adding specific total energy values to states of particles that were advected and subtracting the specific total energy values from states of particles that were not advected over the time interval (see FIG. 3).

Figure 15:
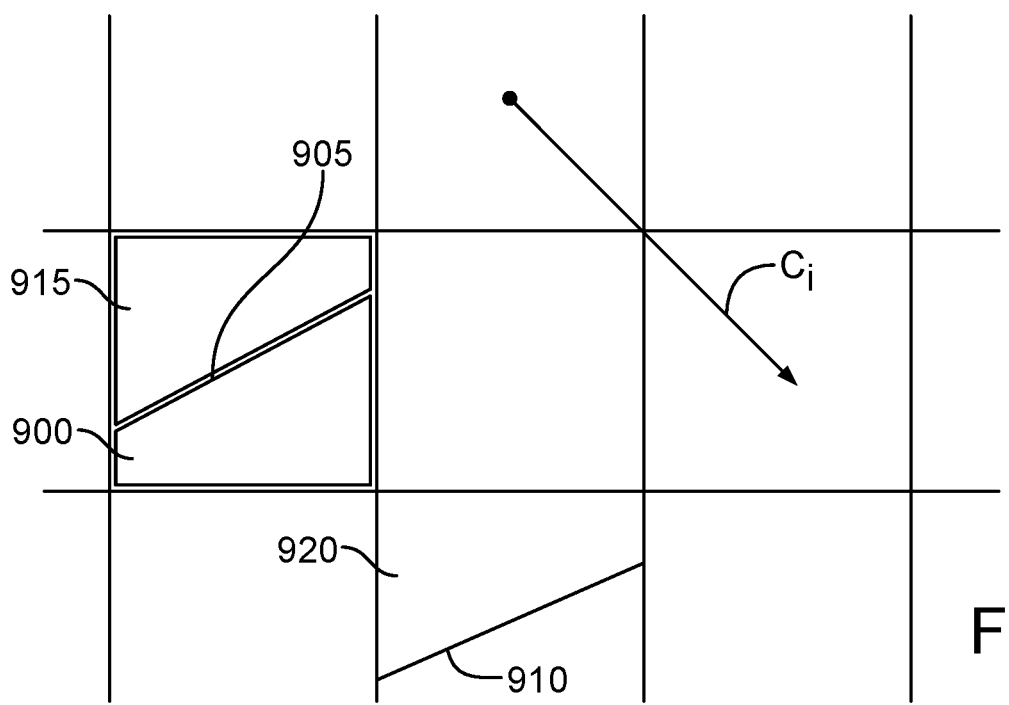
FIG. 15 illustrates movement of particles from a voxel to a surface (prior art).

Referring to FIG. 15, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet Fa. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \quad \text{Eq.(I.33)}$$

where N(x) is the source voxel.

6. Scatter from Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha i F \to V} = \frac{1}{P_f(x)} V_{i\alpha}(x) \Gamma_{\alpha i OUT_f} / V_{\alpha i} \quad \text{Eq.(I.34)}$$

where $P_f(x)$ accounts for the volume reduction of partial voxels. From this, for each state i, the total number of particles directed from the facets to a voxel $N_{(x)}$ is:

$$N_{i F \to V} = \frac{1}{P_f(x)} \sum_\alpha V_{\alpha i}(x) \Gamma_{\alpha i OUT_f} / V_{\alpha i} \quad \text{Eq.(I.35)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values.

To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Fluid dynamics are performed (step 318) FIG. 9. This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

E. Variable Resolution

Referring to FIG. 12, variable resolution (as discussed above) employs voxels of different sizes, hereinafter referred to as coarse voxels 12000 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha C}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Interactions with VR facets are handled using a variable resolution procedure 1300 illustrated in FIG. 13. Most steps of this procedure are carried out using the comparable steps discussed above for interactions with non-VR facets. The procedure 1300 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1302). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 12, 1225) that extends from a facet $F_\alpha$ and that lies behind a facet $F_\beta$ less the unblocked portion of the fine parallelepiped (FIG. 12, 1245) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha}=|c_i n_\alpha| A_\alpha. \qquad \text{Eq.(I.36)}$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha ICr}$ to black facets $F_{\beta ICb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha ICr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets Fc with a weighting factor of $V_{c\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1304-1310). Particles are gathered for fine facets $F_{\alpha F}$ from fine voxels using fine parallelepipeds (step 1304), and for coarse facets $F_{\alpha C}$ from coarse voxels using coarse parallelepipeds (step 1306). Particles are then gathered for black facets $F_{\alpha IRb}$ and for VR fine facets $F_{\alpha IF}$ from both coarse and fine voxels using fine parallelepipeds (step 1308). Finally, particles are gathered for red facets $F_{\alpha IRr}$ from coarse voxels using the differences between coarse parallelepipeds and fine parallelepipeds (step 1310).

Next, coarse voxels that interact with fine voxels or VR facets are exploded into a collection of fine voxels (step 1312). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 4. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1314), and for the black facets $F_{\alpha ICb}$ (step 1316). Dynamics are performed using the procedure illustrated in FIG. 11 and discussed above.

Next, particles are moved between fine voxels (step 1318) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1320).

Particles are also scattered from the black facets $F_{\alpha ICb}$ to the fine voxels (including the fine voxels that result from exploding a coarse voxel) (step 1322). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1324). The voxels for which fluid dynamics are performed do not include the fine voxels that result from exploding a coarse voxel (step 1312).

The procedure 1300 implements similar steps during the second fine time step. Initially, particles are moved between surfaces in a second surface-to-surface advection stage (step 1326). Particles are advected from black facets to red facets, from black facets to fine facets, from fine facets to red facets, and from fine facets to fine facets.

After particles are advected between surfaces, particles are gathered from the voxels in a second gather stage (steps 1328-1330). Particles are gathered for red facets $F_{\alpha IRr}$ from fine voxels using fine parallelepipeds (step 1328). Particles also are gathered for fine facets $F_{\alpha F}$ and $F_{\alpha IF}$ from fine voxels using fine parallelepipeds (step 1330).

Thereafter, surface dynamics are performed for the fine facets $F_{\alpha IF}$ and $F_{\alpha F}$ (step 1332), for the coarse facets $F_{\alpha C}$ (step 1134), and for the red facets $F_{\alpha IC_r}$ (step 1336) as discussed above.

Next, particles are moved between voxels using fine resolution (step 1338) so that particles are moved to and from fine voxels and fine voxels representative of coarse voxels. Particles are then moved between voxels using coarse resolution (step 1340) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1342). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1344).

F. Scalar Transport Solver

As noted above, various types of LBM may be applied for solving fluid flows, which serve as the background carrier for scalar transport. During the simulation, both fluid flow and scalar transport are simulated. For example, the fluid flow is simulated flow using a lattice Boltzmann (LB) approach and the scalar transport is simulated using a set of distribution functions referred to herein as the scalar transport equations.

While a detailed description of the LBM method for simulating fluid flow is provided herein, below is an example of one approach for simulating fluid flow that can be used in conjunction with the scalar simulation:

$$f_i(x + c_i, t+1) = f_i(x, t) - \frac{1}{\tau}(f_i(x, t) - f_i^{eq}(x, t)) + g_i(x, t) \quad \text{Eq. (I.37)}$$

Here $f_i(x,t)$ (i=1, ..., 19), is the particle distribution function, $\tau$ is the single relaxation time, and $f_i^{eq}(x,t)$ is the equilibrium distribution function with a third order expansion in fluid velocity, $$f_i^{eq}(x, t) = \rho \omega_i \left(1 + \frac{c_i \cdot u}{T_o} + \frac{(c_i \cdot u)^2}{2T_o^2} - \frac{u^2}{2T_o} + \frac{(c_i \cdot u)^3}{6T_o^3} - \frac{c_i \cdot u}{2T_o^2}u^2\right) \quad \text{Eq. (I.38)}$$

where $T_o = 1/3$. The discrete lattice velocities $c_i$ are:

$$c_i \begin{cases} 0 \\ (\pm 1, 0, 0), (0 \pm 1, 0), (0, 0, \pm 1) \\ (\pm 1, \pm 1, 0), (\pm 1, 0, \pm 1), (0, \pm 1, \pm 1) \end{cases} \quad \text{Eq. I.39}$$

with $w_o = 1/3$ for rest particle, $w_i = 1/18$ for states of Cartesian directions and $w_i = 1/36$ for states of bi-diagonal directions. $g_i(x,t)$ is the external body force term. The hydrodynamic quantities $\rho$ and u are moments of the particle distribution function:

$$\rho(x, t) = \sum_i f_i(x, t), \quad \rho(x, t)u(x, t) = \sum_i c_i f_i(x, t) \quad \text{Eq. (I.40)}$$

As noted above, the fluid solver is used in conjunction with a scalar transport solver that generated scalar transport information. Thus, in addition to the fluid solver, a separate set of distribution functions, $T_i$, is introduced for scalar transport. Thus, for each voxel in a system, the system simulates both fluid flow and scalar transport to generate a state vector representing the fluid flow and a scalar quantity representing the scalar variable. These simulated results are stored as entries a computer accessible medium.

The set of scalar transport functions provides an indirect way of solving a second order macroscopic scalar transport equation. $T_i$ provides an equation modeling a dynamic evolution of a scalar quantity:

$$T_i(x + c_i, t+1) = T(x, t) + \left(1 - \frac{1}{\tau_T}\Phi_i(x, t)\right) \quad \text{Eq. (I.41)}$$

$$\Phi_i(x, t) = \frac{c_i - u(x, t)}{\rho(x, t)T_o} \cdot \sum_j c_j f_j(x, t)(T_j(x, t) - T(x, t)) \quad \text{Eq. (I.42)}$$

$$T(x, t) = \frac{\Sigma_i f_i(x, t)T_i(x, t)}{\rho(x, t)} \quad \text{Eq. (I.43)}$$

$T_i$ is the scalar distribution function and T is the scalar being solved for. $\tau_T$ is the relaxation time correspond to scalar diffusivity. The relaxation time provides a measure of how long it would take for the system to relax to equilibrium. The terms $f_i$, $\rho$, $T_0$ and u are defined in equations (38), (39) and (41), respectively.

The lattice speed set, represented by $c_i$, can be a discrete set of lattice speeds for use in the scalar simulation. In general the lattice speed set for scalar distribution does not need to be the same as the lattice speed set for fluid distribution because the scalar solver is an additional system attached to the basic fluid solver. For example, fewer lattice speeds can be used in the simulation of the scalar evolution than in the simulation of the fluid flow. A different lattice speed set for scalar could be applied as long as the scalar lattice speed set is a subset of the fluid lattice speed set. For example, a 6-speed LB model may be used for scalar simulation when the 19-speed LB model is used for fluid simulation. Since the 19-speed LB model has a higher order lattice symmetry than the 6-speed LB model, the same 19-speed lattice model for scalar is used in the examples provided below.

The standard, well-known BGK (e.g., as noted above), includes non-equilibrium moments of all orders. It is believed that including all non-equilibrium moments is not necessary isotropic, hydrodynamic, or physically meaningful. Thus, a BGK regularized/filtered collision operator form is used. A collision operator, (j, represents a future collision factor. This collision operator extracts the non-equilibrium scalar properties at only the relevant supported orders (e.g., only the first order). The operator also preserves and relaxes the modes of interest while the non-equilibrium properties associated with the unsupported/undesirable higher order modes are removed. This projection is sufficient for the recovery of the scalar transport physics (e.g., advection and diffusion). Use of this future collision operator is believed to significantly reduce the noise, provides better advection behavior (e.g., can be more Gallidean invariant), and is believed to be more stable than other solutions as compared to other solutions of the well-known BGK operator. Such a form (e.g., as shown in eqn. 43) ensures that only the first order non-equilibrium moment contributes to scalar diffusion in hydrodynamic range. All non-equilibrium moments of higher orders are filtered out by this collision process. Use of the collision operator, (D, as described above is believed to provide benefits including elimination of numerical noise exhibited in BGK and improved robustness. The scalar T serves as its own equilibrium and no complicated expression of scalar equilibrium distribution function is needed. The overall calculation of collision operator $\Phi_1$ is rather efficient. It is believed that filtering the higher order non-equilibrium moments can additionally provide the advantage of reducing aliasing that can exist in the higher order equilibrium solutions.

It can be shown that the collision in (42) obeys the scalar conservation law. Multiplying $f_i'(x,t)=f_i(x+c_i, t+1)$ on both sides of equation (42) and noticing:

$$\sum_i \frac{c_i - u}{\rho T_o} f_i' = \frac{\rho u - \rho u}{\rho T_o} = 0 \qquad \text{Eq. (I.44)}$$

results in $$\sum_i f_i^I T_i' = \sum_i f_i^I T = \rho T \qquad \text{Eq. (I.45)}$$

where $T_i'(x,t)$ denotes the right hand side of equation (42). Hence the scalar collision operator conserves local $\rho T$ which implies realization of local energy conservation if the scalar is considered as temperature. Since $T_i$ propagates along with $f_i$ the energy distribution $E=f_iT_i$ is fully maintained during advection. The global conservation of $\rho T$ is therefore achieved. Furthermore, and most notably, this scheme maintains the exact invariance on uniformity of scalar T. This is straightforward to see, that if $T_i(x,t)-T(x,t)=T=$constant everywhere, then $\phi(x,t)=0$ and $T_i(x, t+1)=T$ everywhere at all later times, regardless of the background flow field. This fundamental property is not demonstrated in any previous lattice Boltzmann scalar models.

Using Chapmann-Enskog expansion, it can be shown that equation (42) recovers the following second order macroscopic scalar transport equation:

$$\frac{\partial \rho T}{\partial t} + \nabla \cdot (\rho u T) = \nabla \cdot \rho \kappa \nabla T \qquad \text{Eq. (I.46)}$$

with $\kappa=(\tau_T-\frac{1}{2})T_0$. The uniformity invariance condition ensures that $\rho$ is outside of $\nabla T$.

Boundary Condition

One substantial advantage of LBM is the capability of dealing with complex geometry. In a generalized volumetric LB surface algorithm to achieve frictionless/frictional boundary conditions (BC) on arbitrary geometry, mass is conserved and both tangential and normal momentum fluxes on the boundary are precisely realized. The local detailed balance is fully satisfied. An adiabatic (zero scalar flux) BC on arbitrary geometry for scalar can be derived as a direct extension of this approach. Once the adiabatic BC is realized, a prescribed finite flux BC can be accomplished.

Unlike other point-wise LB, boundary conditions are conducted on a discretized set of surface elements. These piece-wise flat surface elements together represent a curved geometry. During particle advection, as shown in FIG. 14, each surface element collects incoming particles from its neighboring fluid cells (step 1410). The incoming distributions $f_i^{in}$, $T_i^{in}$ are weighted by volume overlapping of parallelepipeds from the underling surface element with cells in particle moving directions (step 1412). After receiving the incoming quantities, the following surface scalar algorithm is applied (step 1414). To determine the outgoing distributions from the surface, $$T_{i*}^{out} = T^{in} - (f_i^{in}T_i^{in} - f_i^{in}T^{in})/f_{i*}^{out}, \qquad \text{Eq. (I.47)}$$

where $$T^{in} = \frac{\sum_{c_i \cdot n < 0} f_i^{in} T_i^{in} P_i}{\sum_{c_i \cdot n < 0} f_i^{in} P_i} \qquad \text{Eq. (I.48)}$$

$$P_i(\equiv |n \cdot c_i|A)$$

$$c_{i \cdot n} n < 0, \; c_i n = -c_i \cdot P_i = P_{i \cdot n}$$

Here n is the surface normal pointing towards fluid domain and $c_{i \cdot n}n<0$, $c_i n=-c_i$. $P_i(\equiv|n \cdot c_i|A)$ is the volume of parallelepiped in particle direction $c_i$ associated with the surface normal n and area A of a given surface element, and obviously $P_i=P_{i*}$. The outgoing distributions are propagated back from the surface element to fluid cells according to the same surface advection process (step 1416). It is not difficult to show that the above surface scalar collision achieves exact zero surface scalar flux. Taking summation over outgoing directions, the outgoing scalar flux is:

$$\sum_{c_i \cdot n < 0} f_{i*}^{out} T_{i*}^{out} P_{i*} = \sum_{c_i \cdot n < 0} f_{i*}^{out} T_{i*}^{in} P_{i*} - \sum_{c_i \cdot n < 0} (f_i^{in}T_i^{in} - f_i^{in}T^{in})P_i \qquad \text{Eq. (I.49)}$$

Note $P_i=P_{i*}$ and the definition of $T^{in}$ in Eq. (49), the second summation term on the right hand side is zero. In addition, because of the mass flux conservation $\sum_{c_i \cdot n < 0} f_{i*}^{out} P_{i*} = \sum_{c_i \cdot n < 0} f_{i*}^{out} f_i^{in} P_i$ the total outgoing scalar flux is the same as the total incoming scalar flux:

$$\sum_{c_i \cdot n < 0} f_{i*}^{out} T_{i*}^{out} P_{i*} = \sum_{c_i \cdot n < 0} f_i^{in} T_i^{in} P_i \qquad \text{Eq. (I.50)}$$

Therefore zero net surface flux (adiabatic) BC is fully satisfied on arbitrary geometry. If an external scalar source Q(t) is specified on the surface, a source term can be directly added to equation (48)

$$\frac{Q(t)P_i A}{\rho C_p \sum_{c_i \cdot n > 0} P_i}. \qquad \text{Eq. (I.51)}$$

If the boundary condition has a prescribed scalar quantity $T_w$ (for example surface temperature), surface heat flux can be calculated accordingly:

$$Q(t)=\rho C_p \kappa (T_w - T^{in}). \qquad \text{Eq.(I.52)}$$

Numerical Verification

FIGS. 15-18 show four sets of simulation results that demonstrate the capability of the LB scalar solver regarding its numerical accuracy, stability, Galilean invariance, grid orientation independence and etc. Results using two different 2nd order FD schemes, van Leer type of flux limiter scheme and direct mixing scheme (mixture of central and first order upwind schemes) are also presented as comparisons.

A. Shearwave Decay

The first test case is a temperature shearwave decay carried by a constant uniform fluid flow. The initial temperature distribution is a uniform one plus a spatial sinusoidal variation with lattice wavelength L=16 and magnitude $\delta$=6.67%: $T(x)=T_A (1+\delta(\sin(2\pi x/L)))$. $T_A$ is a constant. The velocity of background mean flow is 0.2 and the thermal diffusivity $\kappa$ is 0.002. With such a low resolution and $\kappa$ the numerical stability and accuracy can be well validated. For temperature decay without background flow, both the LB scalar solver and the finite difference methods show excellent agreements with theory. With nonzero background mean flow, the LB scalar solver is still able to accurately compare with theory. However, the FD results show noticeable numerical errors. The temperature profiles at lattice time step 81 are plotted in FIG. 15. Numerical diffusion is seen clearly for the flux-limiter FD scheme, while neither the correct temperature profile nor its location can be maintained by the mixing FD scheme.

B. Inclined Channel with Volume Heat Source

Figure 16:
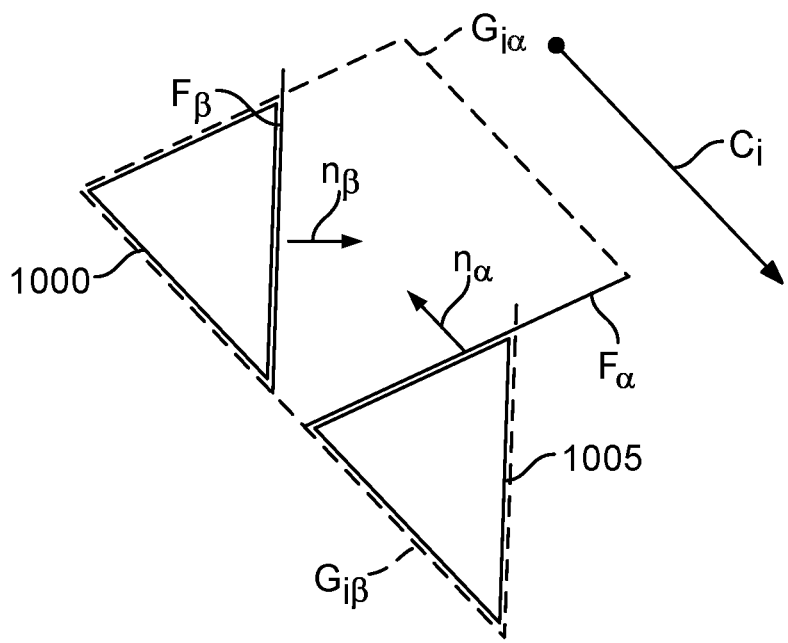
FIG. 16 illustrates movement of particles from a surface to a surface (prior art).

The second test case is a simulation of temperature distribution in a channel flow with different lattice orientations. The channel walls are free-slip, and the fluid flow stays uniform with $U_0$=0.2 as a result. The channel width is 50 (lattice spacing) and the flow Re is 2000. The thermal diffusivity $\kappa$ is 0.005. The temperature on the wall is fixed at $T_W$=⅓. A constant volume heat source q $5\times10^{-6}$ is applied in the bulk fluid domain. The flow has periodic boundary condition in the streamwise direction, which is easy to realize in lattice aligned situation. When the channel (light color) is tilted as shown in FIG. 16, the in and out channel boundaries are matched perfectly in coordinate directions so that the periodic boundary condition is once again realized in the streamwise direction. In order to demonstrate lattice independence, we choose the tilted angle to be 26.56 degree. Like the first test case, the temperature distributions using LB scalar solver and the two FD schemes match analytic solution very well when the channel is lattice aligned. However, the results from the FD schemes depart significantly from theory when the channel is tilted. The simulation results of temperature distribution across the tilted channel are shown in FIG. 16. The LB results are clearly shown to be independent of lattice orientations. The errors from the FD methods are also originated from their fundamental difficulty in dealing with gradient calculation on a tilted boundary orientation, so that additional numerical artifacts are introduced. Since the LB scalar particle advection is exact with the BC presented here, it is thus able to achieve a lattice orientation independent scalar evolution.

C. Temperature Propagation in an Inclined Channel

Due to lack of neighbor information in a non-lattice aligned near wall region on Cartesian grids, it is extremely difficult to get accurate estimation of local gradients, which is essential for FD based methods. Furthermore, because of strong dependency on upwind information, the calculation of scalar advection can be further compromised for FD methods. In contrast, the boundary treatment of LB scalar solver achieves exact local scalar flux conservation as discussed above. The scalar advection in such a near wall region can be computed accurately. High temperature convection in a channel tilted by 30 degree is conducted as a demonstration. The free-slip and adiabatic BCs are enforced at solid walls and fluid velocity is constant $U_0$=0.0909 along the channel. The thermal diffusivity $\kappa$ is 0.002. Initially the temperature is ⅓ everywhere except for T=⅘ at the inlet. Then this temperature front should be convected by the uniform background fluid flow to downstream locations at later times without distortion. The computed temperature front distributions across channel at lattice time step 2000 are shown in FIG. 17. The temperature front of LB scalar solver maintains a nearly straight profile. On the other hand, the temperature fronts from the two FD schemes are shown substantial distortions in near wall regions. It is also worth mentioning that the LB scalar result has shown the thinnest temperature front which implies that LB scalar solver has a smaller numerical diffusion.

D. Rayleigh-Bernard Natural Convection

Rayleigh-Bernard (RB) natural convection is a classical benchmark for accuracy verification of numerical solvers. It has a simple case setup but complex physics phenomena. When Rayleigh number Ra exceeds certain critical value, the system experiences a transition from no-flow to convection. Current study, as shown in FIG. 18, is carried out under the Boussinesq approximation, in that the buoyancy force acting on the fluid is defined as $\alpha\mu g (T-T_m)$ where $\alpha$ is the thermal expansion rate, g is gravity, and $T_m$ is the average temperature value of the top and bottom boundaries. Since the most unstable wave number is $\kappa_c$=3.117 when the $R_a$ exceeds the critical value $R_a$=1707.762, the resolution 101× 50 is used in the study. $P_r$ used here is 0.71. When $R_B$RB convection is established, the heat transfer between two plates is greatly enhanced. The enhancement of the heat transfer is described by Nu=1+<$u_y$T>H/$\kappa\Delta$T.

FIG. 19 shows a screenshot of a fluid simulation. A fluid simulation that used the above described total energy conservation (rather than conventional approaches) would provide a similar depiction of the fluid simulation as well as any customary corresponding calculated data outputs. However, such a fluid simulation that used the above described approach may conduct the fluid simulation faster and or by using less computation resources that other approaches when an object, e.g., an actual physical object, is modeled.

The equilibrium distribution discussed herein does not involve pressure terms and therefore its value is always positive during collision operations providing relatively strong stability. After collision states are advected as it is, resulting in isothermal pressure gradient in momentum and no pressure convection term in the total energy equation. The conservation of the total P energy is done by modifying the stop state such and after advection the local pressure term is added back to the particle states before computing moments providing a proper pressure gradient.

A number of implementations have been described. Nevertheless, it will be understood that various modifications may be made without departing from the spirit and scope of the claims. Accordingly, other implementations are within the scope of the following claims.

What is claimed is:

1. A method for simulating fluid flow on a computer, with the simulation enforcing total energy conservation, the method comprising:
    simulating activity of a fluid across a mesh, the activity of the fluid being simulated so as to model movement of particles across the mesh;
    storing, in a computer accessible memory, a set of state vectors for each mesh location in the mesh, each of the state vectors comprising a plurality of entries that correspond to particular momentum states of possible momentum states at a corresponding mesh location; and
    modifying by the computer, the set of state vectors of the particles by adding specific total energy values to states of particles that are advected and subtracting the specific total energy values from states of particles that are not advected over a time interval.

2. The method of claim 1 wherein subsequent to an advection of the particles to subsequent mesh locations according to the modified set of states, the method further comprises:
adding back to the particle states a local pressure term before computing moments to provide a proper pressure gradient ($\nabla p$).

3. The method of claim 2 wherein the local pressure term includes θ−1 terms that are calculated by the computer.

4. The method of claim 2 wherein simulating activity of the fluid flow comprises simulating the fluid flow based in part on a first set of discrete lattice speeds, and the method further comprises:
simulating time evolution of a scalar quantity based in part on a second set of discrete lattice speeds that are either the same lattice speeds as the first set of discrete lattice speeds or are different in number of lattice speeds as a number of the first set of discrete lattice speeds.

5. The method of claim 1, further comprises:
performing by the computer for a time interval, an advection of the particles to subsequent mesh locations, and wherein simulating the time evolution of total energy comprises:
collecting incoming distributions from neighboring mesh locations for the collision and energy operators;
weighting the incoming distributions;
determining outgoing distributions as a product of the collision and energy operators; and
propagating the determined outgoing distributions.

6. The method of claim 5, further comprising:
applying a zero net surface flux boundary condition such that the incoming distributions are equal to the determined outgoing distributions.

7. The method of claim 1 wherein to recover exact shear stress for an arbitrary Prandtl number the energy collision term is given by:

$$q_i^l(x,t) = q_i^{eq}(x,t) + \left(1 - \frac{1}{\tau_q}\right)\left[\left(\frac{c_i - v}{\rho RT}\right) \cdot \left(\Pi_q - \frac{vv}{RT + v^2} : \Pi_q\right)\right] + \left[\left(\frac{1}{\tau_q} - \frac{1}{\tau}\right)\left(\frac{c_i - v}{\rho RT}\right) \cdot (v \cdot \Pi)\right]$$

where $\Pi = \Sigma_i c_i c_i (f_i - f_i^{eq})$ is the filtered second order moment of non-equilibrium component, and where $q_i'(x, t)$ is a post collision specific total energy distribution, $q_i^{eq}(x, ty)$ is an equilibrium specific total energy distribution, t is collision relation time, x is the lattice location within a volume, t is a particular point in time, i is an index number of lattice velocities in a lattice velocity set, T is a temperature, Π is a non-equilibrium momentum flux, $\upsilon$ is a discrete velocity, R is gas constant, $c_i$ is lattice velocity, and ρ is density.

8. The method of claim 1 wherein calculating the set of energy values for the mesh locations in the mesh further comprises:
calculating total energy $E_t$ given by $E_t = E + v^2/2$, where E is energy and v is the velocity.

9. The method of claim 1 wherein simulating activity comprises:
applying by the computer an equilibrium distribution and a second distribution function for specific total energy $E_t$, with the second distribution defined as a specific scalar that is advected along with the flow distribution $f_i$.

10. The method of claim 9 wherein the second distribution function accounts for the non-equilibrium contribution of $f_i$ to the energy equation to obtain correct flow behavior near boundaries and across different grid resolutions wherein collision operators for distribution functions are given by:

$f_i^1(x,t) = f_i(x,t) + \Omega_f[f_i(x,t), f_i^{eq}(x,t)]$ $q_i^1(x,t) = q_i(x,t) + \Omega_q[f_i(x,t), f_i^{eq}(x,t), q_i(x,t), q_i^{eq}(x,t)]$ where terms $\Omega_f$, $\Omega_q$ represent respective collision operators; and equilibrium distributions used in the above equations are:

$$f_i^{eq} = \rho\omega_i\left[1 + \xi \cdot u + \frac{(\xi \cdot u)^2 - u^2}{2} + \frac{(\xi \cdot u)^3 - 3(\xi \cdot u)u^2}{6}\right]$$

$$q_i^{eq} = E_t = E + v^2/2.$$

where $q_i^{eq}$ is an equilibrium specific total energy distribution, $E_t$ refers to specific total energy, which is total energy divided by mass, E is specific internal energy and v is the velocity, $q_i'(x, t)$ is a post collision specific total energy distribution, x is the lattice location within a volume, t is a particular point in time, i is an index number of lattice velocities in the lattice velocity set, and $f_i(x, t)$ is a distribution function $f_i^{eq}(x,t)$ is an equilibrium distribution function, $\omega_i$ is a lattice weight, and $\xi_i$ and u are nondimensionalized lattice and flow velocity, which are normalized by a square root of lattice temperature $T_0$.

11. A computer program product tangibly embodied in a non-transitory computer readable medium, the computer program product including instructions that, when executed, simulate a physical process fluid flow, and cause a computing system to:
simulate activity of a fluid across a mesh, the activity of the fluid being simulated so as to model movement of particles across the mesh;
store, in computer memory, a set of state vectors for each mesh location in the mesh, each of the state vectors comprising a plurality of entries that correspond to particular momentum states of possible momentum states at a corresponding mesh location; and
modify the set of state vectors of the particles by adding specific total energy values to states of particles that are advected and subtracting the specific total energy values from states of particles that are not advected over the time interval.

12. The computer program product of claim 11 wherein the total energy adds the term prior to an advection, so that pressure is convected, and to compensate for added energy, the energy is removed from stop states.

13. The computer program product of claim 12 wherein removing the added energy conserves total energy and provides the correct pressure velocity term.

14. The computer program product of claim 13 wherein removing the added energy is provided by modifying the stop state $\tilde{q}_0(x, t)$ such that $$\Sigma_i \tilde{f}_i \tilde{q}_i = \rho\left(E + \frac{u^2}{2}\right).$$

where $\tilde{q}_0(x, t)$ is a stop state, $\rho(E+v^2/2)$ is the total energy and $\tilde{f}_i$ is flow distribution $\tilde{q}_i$ is specific total energy distribution.

15. A computer system for simulating a physical process fluid flow, the system comprising:
   one or more processor devices;
   computer memory coupled to the one or more processor devices; and
   a computer readable medium storing instructions that, when executed, simulate a physical process fluid flow, and cause the computing system to:
      simulate activity of a fluid across a mesh, the activity of the fluid being simulated so as to model movement of particles across the mesh;
      store, in computer memory, a set of state vectors for each mesh location in the mesh, each of the state vectors comprising a plurality of entries that correspond to particular momentum states of possible momentum states at a corresponding mesh location; and
      modify the state vectors of the particles by adding specific total energy values to states of particles that are advected and subtracting the specific total energy values from states of particles that are not advected over the time interval.

16. The system of claim 15 wherein the system further comprises instructions to:
   add back to the particle states a local pressure term before computing moments to provide a proper pressure gradient ($\nabla p$), subsequent to an advection of the particles to subsequent mesh locations according to the modified set of state vectors.

17. The system of claim 16 wherein the local pressure term includes $\theta-1$ terms that are calculated by the system.

18. The system of claim 16 wherein instructions to simulate activity of the fluid flow comprises instructions to:
   perform an advection of the particles to subsequent mesh locations;
   simulate the fluid flow based in part on a first set of discrete lattice speeds; and
   simulate time evolution of a scalar quantity based in part on a second set of discrete lattice speeds that are either the same lattice speeds as the first set of discrete lattice speeds or are different in number of lattice speeds as a number of the first set of discrete lattice speeds.

19. The system of claim 15 wherein instructions to calculate the set of energy values for the mesh locations in the mesh include instructions to calculate total energy $E_t$ given by $E_t=E+v^2/2$, where E is energy and v is the velocity.

20. The system of claim 15 further comprises instructions to cause the system to:
   apply an equilibrium distribution and a second distribution function for specific total energy $E_t$, with the second distribution defined as a specific scalar that is advected along with the flow distribution $f_i$.

* * * * *

UNITED STATES PATENT AND TRADEMARK OFFICE
CERTIFICATE OF CORRECTION

PATENT NO. : 12,079,552 B2
APPLICATION NO. : 17/689131
DATED : September 3, 2024
INVENTOR(S) : Pradeep Gopalakrishnan et al.

Page 1 of 1

It is certified that error appears in the above-identified patent and that said Letters Patent is hereby corrected as shown below:

In the Claims

Column 31, Line 49, Claim 7, delete "$\Pi = \Sigma_i c_i c_i (f_i - f_i^{eq}$" and insert --$\Pi = \Sigma_i c_i c_i (f_i - f_i^{eq})$--

Column 31, Line 52, Claim 7, delete "$q_1^{eq}(x, ty)$" and insert --$q_1^{eq}(x, t)$"--

Column 31, Line 53, Claim 7, delete "t" and insert -- $\tau$ --

Column 32, Line 6, Claim 10, delete "$f_i^1(x, t)$" and insert --$f_i^l(x, t)$--

Column 32, Line 9, Claim 10, delete "$\rho\omega_i [1 + \xi \cdot u + \frac{(\xi \cdot u)^2 - u^2}{2} + \frac{(\xi \cdot u)^3 - 3(\xi \cdot u)u^2}{6}$" and insert --$\rho\omega_i [1 + \xi \cdot u + \frac{(\xi \cdot u)^2 - u^2}{2} + \frac{(\xi \cdot u)^3 - 3(\xi \cdot u)u^2}{6}]$--

Column 32, Lines 63-66, Claim 14, delete "$\Sigma_i \tilde{f}_i \bar{q}_1 = \rho(E + \frac{u^2}{2})$." and insert --$\Sigma_i \tilde{f}_i \tilde{q}_i = \rho(E + \frac{u^2}{2})$.--

Signed and Sealed this
Twenty-fifth Day of March, 2025

Coke Morgan Stewart
*Acting Director of the United States Patent and Trademark Office*